US008706846B2

(12) United States Patent
Chen et al.

(10) Patent No.: US 8,706,846 B2
(45) Date of Patent: Apr. 22, 2014

(54) METHOD AND SYSTEM FOR TRANSMITTING LIVE MEDIA STREAMING IN PEER-TO-PEER NETWORKS

(75) Inventors: Jiann-Jone Chen, New Taipei (TW); Jiann-Yu Wen, Kaohsiung (TW); Hua-Yi Lin, New Taipei (TW); Kuo-Huang Chung, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 150 days.

(21) Appl. No.: 13/041,440

(22) Filed: Mar. 7, 2011

(65) Prior Publication Data

US 2012/0170476 A1 Jul. 5, 2012

(30) Foreign Application Priority Data

Dec. 30, 2010 (TW) .............................. 99146768 A

(51) Int. Cl.
*H04L 12/18* (2006.01)
(52) U.S. Cl.
USPC ........................................................ 709/220
(58) Field of Classification Search
CPC ................................................ H04L 12/1863
See application file for complete search history.

(56) References Cited

U.S. PATENT DOCUMENTS

| | | | |
|---|---|---|---|
| 2006/0251062 A1* | 11/2006 | Jain et al. ...................... | 370/389 |
| 2007/0136476 A1 | 6/2007 | Rubinstein | |
| 2007/0280255 A1 | 12/2007 | Tsang et al. | |
| 2010/0064049 A1 | 3/2010 | Magharei et al. | |
| 2011/0219142 A1* | 9/2011 | Lin et al. ...................... | 709/235 |

OTHER PUBLICATIONS

Cheng et al., "A New Live Streaming Media Architecture for Peer-to-Peer Network," IEEE Int. Conf. on Multimedia and Ubiquitous Engineering, 2008, pp. 373-377.
Hu et al., "A Priority-based Hierarchical Application Layer Multicast Model," IEEE Int. Conf. Wireless Communications, Networking and Mobile Computing, pp. 1-6, Sep. 2009.
Kim et al., "Efficient Tree Management for Resilient Overlay Multicast," IEEE Int. Conf. on Advanced Communication Technology, Feb. 15-18, 2009, pp. 373-377.
Tan et al., "Improving the Fault Resilience of Overlay Multicast for Media Streaming," IEEE Transactions on Parallel and Distributed Systems, vol. 18, No. 6, Jun. 2007, pp. 721-734.
Wu Chia-Yen, "An IPTV Implementation of a Campus Media Center," Master thesis of National Taiwan University of Science and Technology, Jul. 29, 2008, pp. 1-71, Taipei, Taiwan.

(Continued)

*Primary Examiner* — Hassan Phillips
*Assistant Examiner* — Omeed D Rahgozar
(74) *Attorney, Agent, or Firm* — Jianq Chyun IP Office

(57) ABSTRACT

A method and a system for transmitting a live media stream to a plurality of nodes under a multicast tree in peer-to-peer (P2P) networks are provided. First, the reliability of each node is calculated according to a number of child nodes that can be supported by the node and an accumulated on-line time of the node. According to the number of child nodes and the reliability of each node, the nodes are rearranged in a database to establish an ideal reliable multicast tree. Finally, according to the reliability of each node, a location of each node in the multicast tree is practically adapted in sequence in a descending order, and a relative delay between nodes is weighted and compared, so a level difference between the adapted level of the node in the multicast tree and the level of the node in the ideal reliable multicast tree is the smallest.

28 Claims, 19 Drawing Sheets

Calculate a reliability of each node according to a number of child nodes that can be supported under each node and an accumulated on-line time of the node — S702

Rearrange the nodes according to the number of child nodes and the reliability of each node to establish an ideal reliable multicast tree — S704

Adapt a location of each node in the multicast tree in sequence in a descending order according to the reliability of each node, so a level difference between the adapted level of the node in the multicast tree and a level of the node in the ideal reliable multicast tree is the smallest — S706

(56) References Cited

OTHER PUBLICATIONS

Sripanidkulchai et al., "The Feasibility of Supporting Large-Scale Live Streaming Applications with Dynamic Application End-Points," Proc. ACM SIGCOMM' 04, Aug. 30-Sep. 3, 2004, Portland, USA.

Guo et al., "Scalable live video streaming to cooperative clients using time shifting and video patching," Proc. IEEE INFOCOM '04, 2004, pp. 1501-1511.

* cited by examiner

Arrange according to the reliability:

Ideal reliable multicast tree:

METHOD AND SYSTEM FOR TRANSMITTING LIVE MEDIA STREAMING IN PEER-TO-PEER NETWORKS

CROSS-REFERENCE TO RELATED APPLICATION

This application claims the priority benefit of Taiwan application serial no. 99146768, filed Dec. 30, 2010. The entirety of the above-mentioned patent application is hereby incorporated by reference herein and made a part of this specification.

TECHNICAL FIELD

The disclosure relates to a method and a system for transmitting a live media stream in peer-to-peer (P2P) networks.

BACKGROUND

A conventional multimedia streaming technology usually adopts a server-client network transfer structure, in which mainly a server supplies a multimedia content streaming service to a user end in need. However, when such a server-client network transfer structure is adopted, in a condition that the number of connected users greatly increase at the same time, the server eventually fail to bear the load due to hardware conditions or that the network bandwidth reaches an upper limit, or even the whole service is terminated due to abrupt interruption (for example, a problem occurred to hardware equipment or network disconnection) of a single server.

In a P2P network structure, the problem that the server is overloaded in the server-client network transfer structure can be solved, and in applications of transmitting a live streaming, tree-based P2P network transmission is the most popular P2P transmission mode. However, in a conventional tree-based P2P network, a "transmit bottleneck" might occur due to different joining orders of the nodes. Specifically, in multicast tree transmission, if a principle of the constructed tree-based structure is to adopt a node bandwidth as a reference, the bandwidth algorithm fails to be optimized due to practical joining orders of the nodes, and in severe cases a "bottleneck" or "transmission interruption" might occur to the transmission of the whole tree. FIGS. 1A and 1B are examples of a transmission bottleneck in a conventional multicast tree. In a condition that the bandwidth and quantity of the nodes are already known, FIG. 1A shows an ideal multicast tree having the smallest depth established according to the bandwidth order. However, in practical conditions, the joining order of nodes is unpredictable, so many nodes having a low bandwidth capacity joins the service earlier than the nodes having a high bandwidth capacity, such that a multicast tree in which an upper layer has a small load capacity might be established, thereby influencing the depth and transmit stability of the whole tree, and this case is referred to as a "bottleneck" of the multicast tree, as shown in FIG. 1B.

On the other hand, a severe problem in the conventional multicast tree transmission structure is that disconnection of an upper layer node might cause transmission interruption to a lot of nodes under the upper layer node, or even the whole child tree collapses. If the problem occurs in the bottleneck condition, the situation becomes more severe, so a frequency of changes of the upper layer node should be reduced as much as possible, so as to increase the stability of the multicast tree. FIG. 2 shows an example that a child tree of lower layer nodes collapses due to disconnection of an upper layer node in the conventional multicast tree transmission. As can be seen from FIG. 2, upon the disconnection of the upper layer node in the multicast tree, the child tree of the lower layer nodes thereof collapses accordingly, thereby causing transmission interruption to a lot of nodes.

SUMMARY

The disclosure is directed to a method and a system for transmitting a live media stream in P2P networks, so as to improve a node connection mechanism in a tree-based P2P live streaming network, thus enhancing a transmission quality in a multicast tree, and reducing a probability of transmission interruption of the node.

The disclosure provides a method for transmitting a live media stream in P2P networks, suitable for transmitting a live media stream to a plurality of nodes under a multicast tree. In the method, the reliability of each node is calculated according to a number of child nodes that can be supported by the node and an accumulated connection time of the node, and then according to the number of child nodes and the reliability of each node, an ideal condition of the multicast tree after the nodes are arranged—an "ideal reliable multicast tree" is tentatively calculated, which serves as a reference for adapting locations of the nodes. Finally, according to the reliability of each node, a location of each node in the multicast tree is adapted in sequence in a descending order, so a level difference between the adapted level of the node in the multicast tree and the level of the node in the ideal reliable multicast tree is the smallest.

The disclosure provides a system for transmitting a live media stream in P2P networks, suitable for managing a plurality of nodes under a multicast tree to transmit a live media stream. The system includes a target establishment module and a node adaptation module. The target establishment module calculates the reliability of each node according to a number of child nodes that can be supported by the node and an accumulated on-line time of the node, and rearranges the nodes according to the number of child nodes and the reliability of each node to establish an ideal reliable multicast tree. The node adaptation module adapts a location of each node in the multicast tree in sequence in a descending order according to the reliability of each node, so a level difference between the adapted level of the node in the multicast tree and the level of the node in the ideal reliable multicast tree is the smallest.

In conclusion, in the method and the system for transmitting a live media stream in P2P networks of the disclosure, a node bandwidth, an on-line time, and a relative delay serve as system control parameters, so as to dynamically adapt locations of nodes in a multicast tree. Further, a hop update mode is adopted in the adaptation process, so all nodes in the multicast tree can be considered more comprehensively and an objective of rapid update can also be achieved.

In order to make the features and advantages of the disclosure more comprehensible, the disclosure is illustrated in detail with the embodiments with reference to the accompanying drawings.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
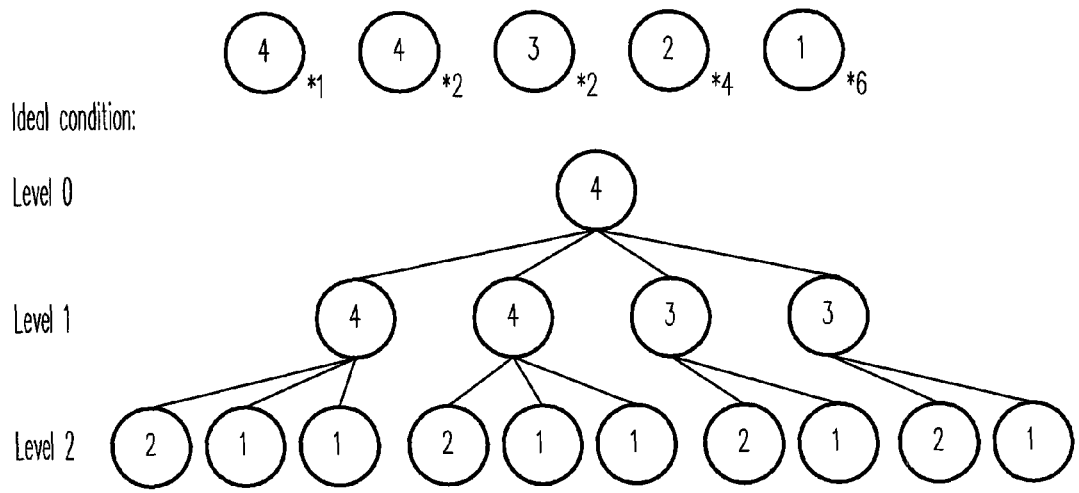
FIGS. 1A and 1B depict examples of a transmission bottleneck in conventional multicast tree.
Figure 1B:
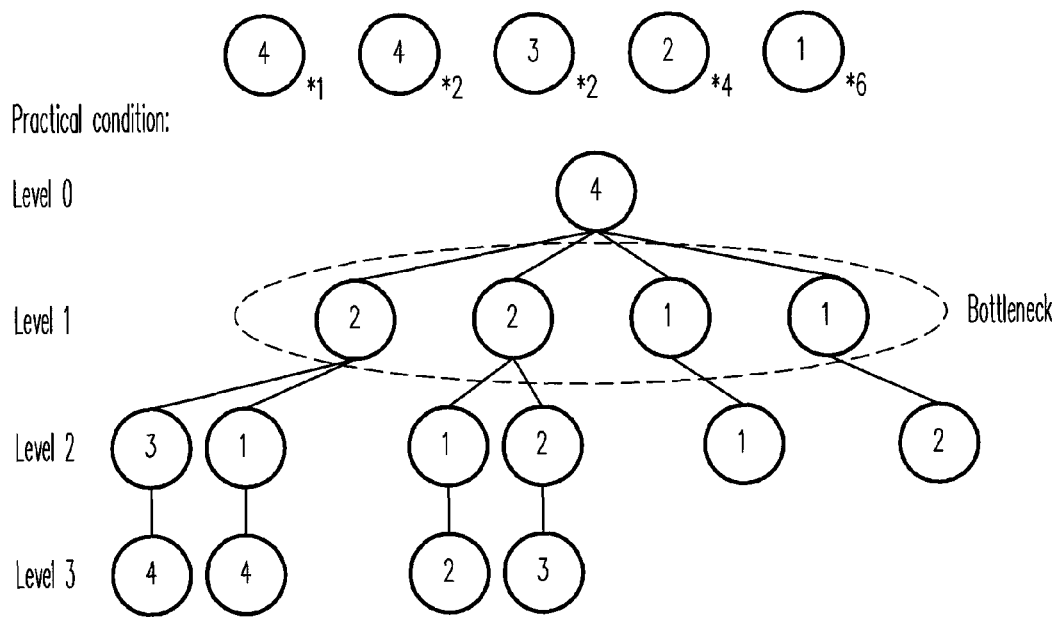
Figure 2:
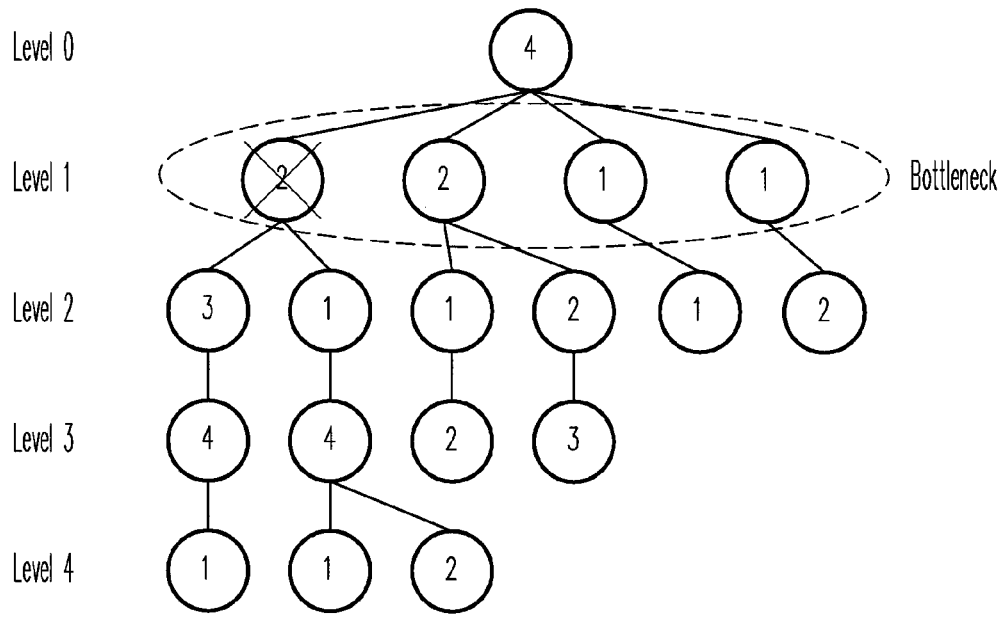
FIG. 2 shows an example that a child tree of lower layer nodes collapses caused by disconnection of an upper layer node in the conventional multicast tree transmission.

The disclosure provides a multi-para metered adaptive tree (MPAT) algorithm, a location of each of the nodes in a multicast tree is dynamically adapted according to a bandwidth capacity, an on-line time, and a relative delay of the node, thereby reducing a depth and a transmission delay of the multicast tree, and additionally a hop update mode is adopted in the adaptation process, so as to achieve an objective of rapid update. Major parameters considered in the disclosure are categorized as follows.

(1) Node Bandwidth Capacity: In a multicast tree transmission structure, a bandwidth capacity of a node directly influences a depth and a transmission delay of the whole multicast tree, so in the disclosure, a node having a higher bandwidth capacity is positioned at an upper layer location of the multicast tree in a dynamic adaptation mode, thereby reducing the depth and the transmission delay of the multicast tree, and solving "transmission bottleneck" caused by the unsupervised joining order.

(2) Node On-Line Time: At the early stage of an Internet Protocol Television (IPTV) service, a user usually selects and connects to a channel to watch and determine whether the program content is interesting. If the user is not interested, the user leaves the channel, and if the user had already watched the program for a period of time (for example, watches half of a live ball game or a movie), the probability that the user goes offline is relatively low. Therefore, as can be seen from statistical data, probability distribution of a node life is approximately close to LogNormal distribution.

(3) Relative. Delay Between Nodes: In the disclosure, in consideration of transmission and application of the live media streaming, consideration of a relative delay is added in the process of multicast tree adaptation, so as to reflect overall delay situations of the multicast tree before and after update through measurement of a practical network environment, thereby evaluating the necessity and cost of dynamic adaptation, and further performing an action of adapting nodes.

Specifically, in the disclosure, the node bandwidth capacity BWCapacity($p_i$) is defined as a capacity of loading nodes by the node $p_i$ in the multicast tree (the number of child nodes that can be supported), and the calculation formula is as follows:

$$BWCapacity(p_i) = c(p_i) + \left\lfloor \frac{b(p_i) - f(p_i)}{r} \right\rfloor$$

$c(p_i)$ represents a number of child nodes already connected under the node $p_i$; $b(p_i)$ represents a maximum bandwidth that the node is able to support; $f(p_i)$ represents a bandwidth currently used by the node $p_i$; and r represents a bit rate (kB/s) of a unit live media streaming. A currently used bandwidth $f(p_i)$ is subtracted from a maximum bandwidth $b(p_i)$ that each node $p_i$ is able to support to obtain a rest bandwidth, and the rest bandwidth is divided by a bit rate r of the live media streaming to estimate an extra number of nodes that the node $p_i$ is able to support. Finally, the extra number of nodes of the node $p_i$ is added to the number of child nodes already connected under the node $p_i$, that is, the number of child nodes that can be supported by the node $p_i$ is obtained.

It should be noted that, the disclosure further quantifies the number of child nodes and the on-line time of the node $p_i$ into a bandwidth fraction and a time fraction, and respectively multiplies the bandwidth fraction and time fraction by a corresponding weight value and calculates a sum, so as to obtain the reliability of the node $p_i$.

For example, the bandwidth fraction $B(p_i)$ is a result obtained by quantifying the node bandwidth capacity BWCapacity($p_i$), for example, the node bandwidth capacity BWCapacity($p_i$) is divided by a maximum value BWC_Max of a bandwidth capacity of all nodes in the system and then multiplied by 10, and the calculation formula is as follows:

$$B(p_i) = \left\lfloor \frac{BWCapacity(p_i)}{BWC\_Max} \times 10 \right\rfloor.$$

Similarly, the time fraction $T(p_i)$ is a result obtained by quantifying an on-line time TimeDuration($p_i$) from joining of the node $p_i$ to the present, for example, the on-line time TimeDuration($p_i$) is divided by a maximum value TD_Max of the on-line time and then multiplied by 10, and the calculation formula is as follows.

$$T(p_i) = \left\lfloor \frac{TimeDuration(p_i)}{TD\_Max} \times 10 \right\rfloor.$$

After the bandwidth fraction $B(p_i)$ and the time fraction $T(p_i)$ of the node $p_i$ is obtained, next, a system or a user respectively multiplies the bandwidth fraction $B(p_i)$ and the time fraction $T(p_i)$ by a corresponding weight value α and 1−α and calculates a sum according to a practical environment or requirement, so as to obtain the reliability Reliability ($p_i$) of the node $p_i$, and the calculation formula is as follows:

Reliability($p_i$)=α×$B(p_i)$+(1−α)×$T(p_i)$.

In the multicast tree, in a case that the node reliability is already known (it is assumed that the total number of nodes is m), the nodes can be numbered according to the reliabilities of nodes, which are represented as $p_0, p_1, \ldots, p_m$, so the reliabilities of the nodes satisfy a condition of Reliability($p_0$)≥Reliability($p_1$)≥ . . . ≥Reliability($p_m$). In the bandwidth limit of the node load, a multicast tree constructed by arranging the nodes with the numbers ascending is here referred to as an "ideal reliable multicast tree".

Figure 3:
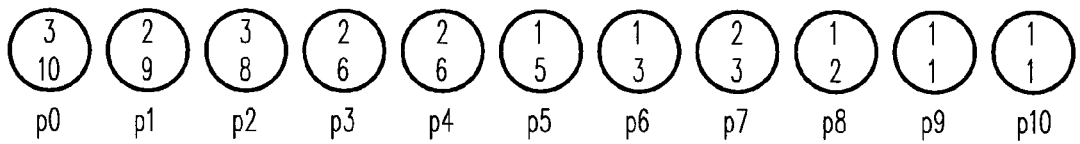
FIG. 3 is an example of an ideal reliable multicast tree according to an embodiment of the disclosure.
Figure 3:
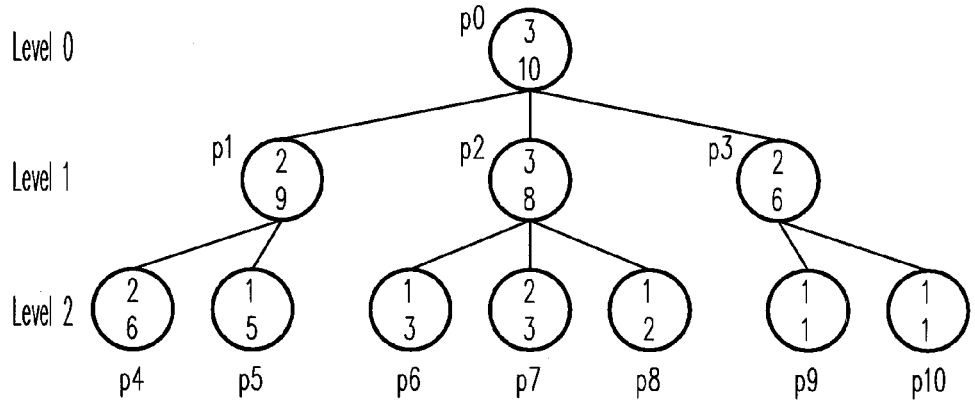

For example, FIG. 3 shows an example of an ideal reliable multicast tree according to an embodiment of the disclosure. Referring to FIG. 3, it is assumed that in total eleven nodes join the system, and the system calculates a number of child nodes that can be supported by each node and a reliability of each node using the method, and then sorts the nodes and names the nodes as $p_0$ to $p_{10}$ according to the reliability of each node. In FIG. 3, a number above each node represents a number of child nodes that can be supported by the node BWCapacity($p_i$), a number below represents the reliability of the node Reliability($p_i$), and the multicast tree constructed through arrangement in sequence according to the number of the node in an ascending order is the ideal reliable multicast tree.

Specifically, in this embodiment, the system takes a node $p_0$ having the greatest reliability as the parent node of the smallest depth tree, then joins the rest nodes as child nodes $p_1$, $p_2$, and $p_3$ under the parent node $p_o$ in a descending order in sequence according to the reliabilities of the rest nodes, in which the number of the child nodes is equal to the number of child nodes that can be supported by the parent node. Subsequently, the system repeats aforesaid steps, and continues joining the rest nodes under each child node using each child node (child nodes $p_1$, $p_2$, and $p_3$) as a parent node, until all nodes are joined, thus finishing the ideal reliable multicast tree.

As discussed above, the MPAT algorithm in the disclosure adopts various parameters obtained through the calculation, and referring to the case of the ideal reliable multicast tree, the locations of the nodes in the multicast tree are practically adapted, so as to achieve an objective of fast update. The process structure of the MPAT algorithm in the disclosure mainly includes the following three parts: (1) a Join Mode for adding nodes; (2) an Adaptive Mode for dynamically updating nodes; and (3) a Leave Mode for a node to leave.

Figure 4:
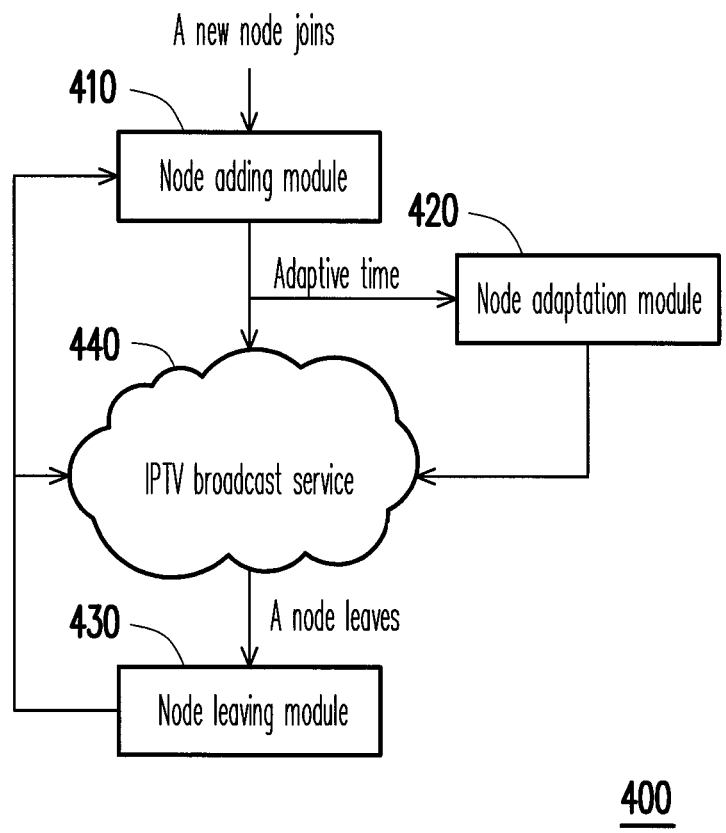
FIG. 4 is a schematic view of a system for transmitting a live media stream in P2P networks according to an embodiment of the disclosure.

For example, FIG. 4 is a schematic view of a system for transmitting a live media stream in P2P networks according to an embodiment of the disclosure. Referring to FIG. 4, a transmission system 400 in this embodiment includes a node adding module 410, a node adaptation module 420, and a node leaving module 430.

First, when a new node is joined, the transmission system 400 enters a Join Mode, and the node adding module 410 selects a parent node through a selection mechanism thereof to perform an IPTV broadcast service 440. Specifically, when a new node joins the multicast tree, the node adding module 410 searches for a node which is not fully loaded in the multicast tree as a target node, so as to join the new node as a child node of target node.

In the broadcast process, after every periodic adaptive time, the transmission system 400 enters an Adaptive Mode of dynamic update, and at this time the node adaptation module 420 first evaluates the update cost, and calculates the improved transmission delay of the multicast tree after update. If the improved delay time is greater than the adaptive time required for the update, the Adaptive Mode of the node is performed. After the node adaptation module 420 finishes adaptation of all nodes in the multicast tree, an action of parent node update starts to be performed for the node (if the parent node is not changed, the update is not needed), and the updated node can perform more stable broadcast.

In the broadcast process, if a parent node leaves, the transmission system 400 enters a Leave Mode, and the node leaving module 430 selects a grandparent node as a new parent node. If the grandparent nodes are already fully loaded, the nodes under the parent node enter the Join Mode again to search for a new parent node. Specifically, when an old node in the multicast tree leaves, the node leaving module 430 judges whether a parent node of the old node is able to support all child nodes of the old node. If yes, the node leaving module 430 connects all child nodes of the old node to the parent node. On the contrary, if no, the node leaving module 430 joins a part of child nodes of the old node as child nodes of the parent node and joins the rest child nodes of the old node in the multicast tree again as new nodes according to the number of child nodes that the parent node currently can support.

The detailed steps of each mode are illustrated below.

As for the Join Mode, the design of the mode mainly expects that a newly joined node can first fill upper layer locations in the multicast tree, so branches of the multicast tree are balanced, and a multicast tree depth is reduced. When a new node $p_i$ intends to join the service channel, the system first selects a node having a node support capacity not fully loaded from the multicast tree of the channel ($\{p_i | \forall p_i, \text{BW-Capacity}(p_i) - C(p_i) > 0\}$). Next, among all nodes that are not fully loaded, nodes at the highest level of the multicast tree are selected as candidates of the parent node. Finally, among all the selected parent nodes, the node having the greatest reliability is selected as the parent node to join a new node $p_i$, and the broadcast is started.

Figure 5A:
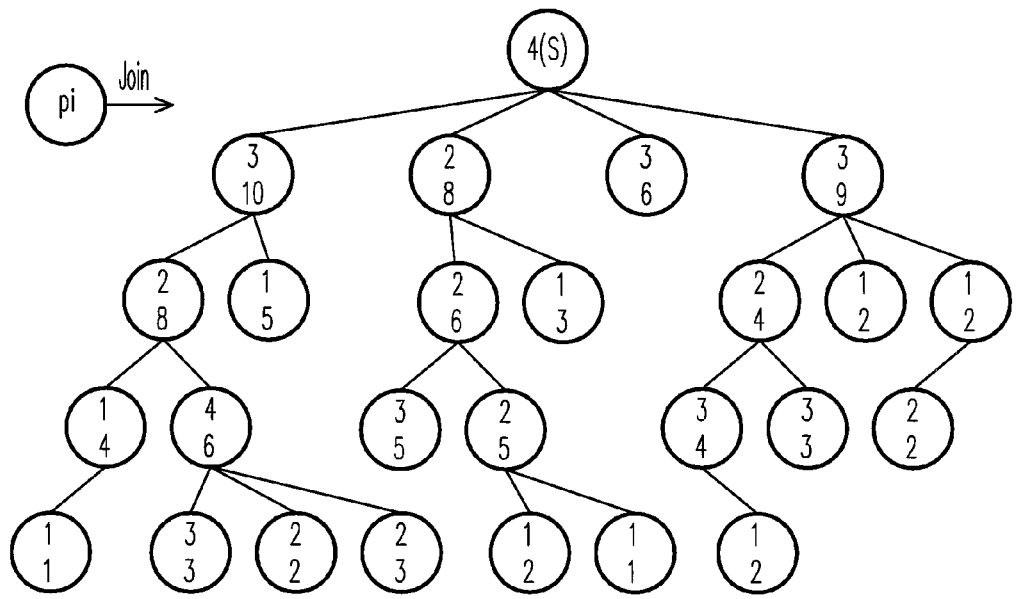
FIGS. 5A to 5D are examples of a Join Mode according to an embodiment of the disclosure.
Figure 5B:
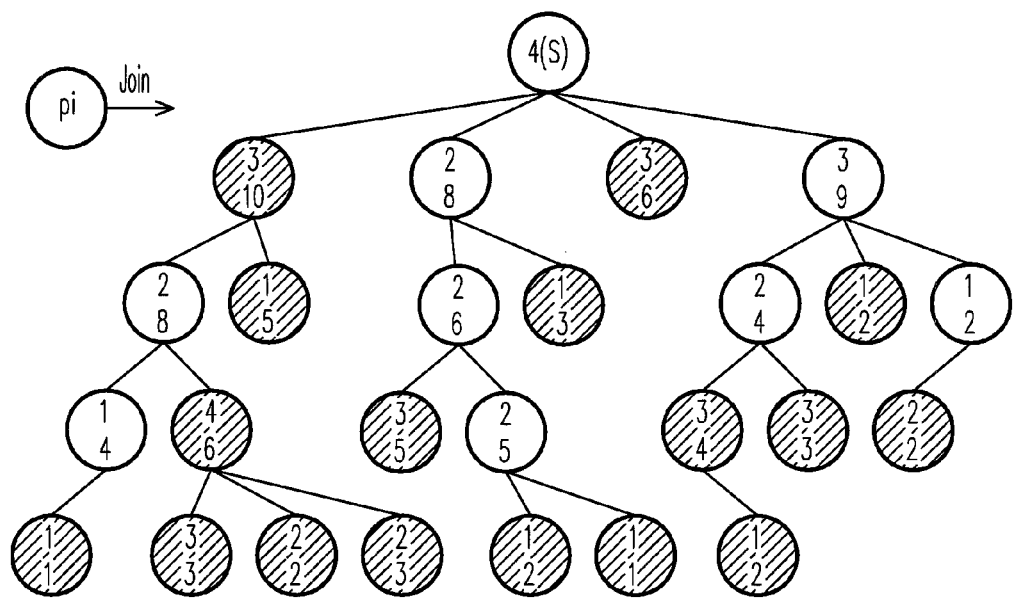
Figure 5C:
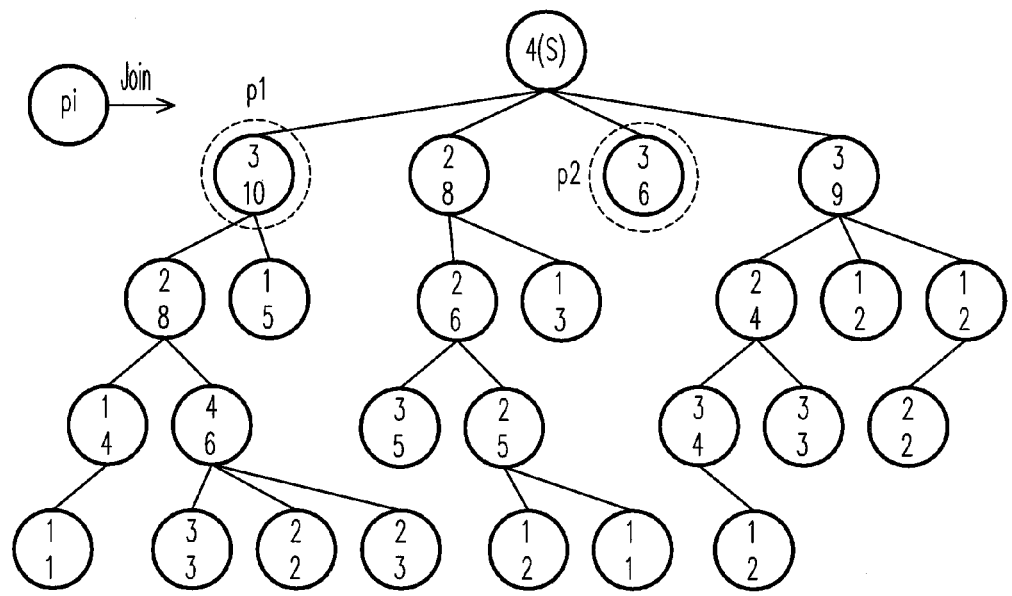
Figure 5D:
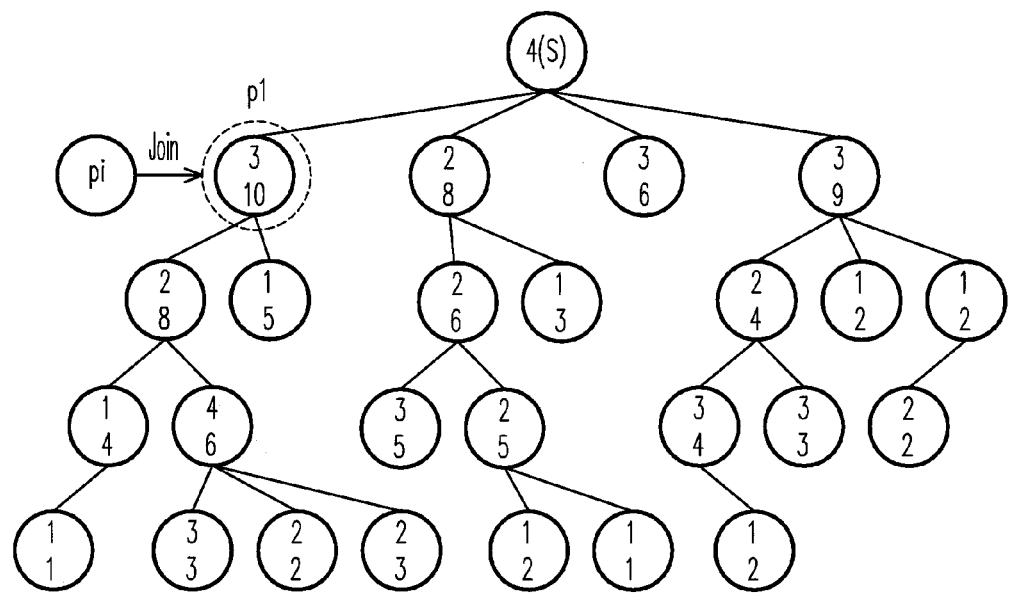

For example, FIGS. 5A to 5D are examples of a Join Mode according to an embodiment of the disclosure. Referring to FIG. 5A first, when a new node pi intends to join a multicast tree, the system selects a node which is not fully loaded from the multicast tree of the channel (for example, the nodes marked with oblique lines in FIG. 5B). Next, among all the found nodes that are not fully loaded, nodes at the highest level in the multicast tree are selected as parent node candidates (for example, nodes P1 and P2 in FIG. 5C). Finally, among all the selected parent node candidates, a node having the greatest reliability is selected as the parent node to join the new node pi (for example, the node P1 in FIG. 5D), and broadcast starts.

As for the Adaptive Mode, the mode mainly adopts a "hop" adaptation mode, in which locations of nodes are joined or exchanged in a hop mode by comparing nodes in the vertical and horizontal directions, thereby updating a transmission state of the multicast tree, so that the number of exchanging nodes can be reduced to achieve the update objective more rapidly, and conditions of all nodes in the multicast tree can be considered more comprehensively, such that the adaptation result further approaches an ideal condition.

Figure 6:
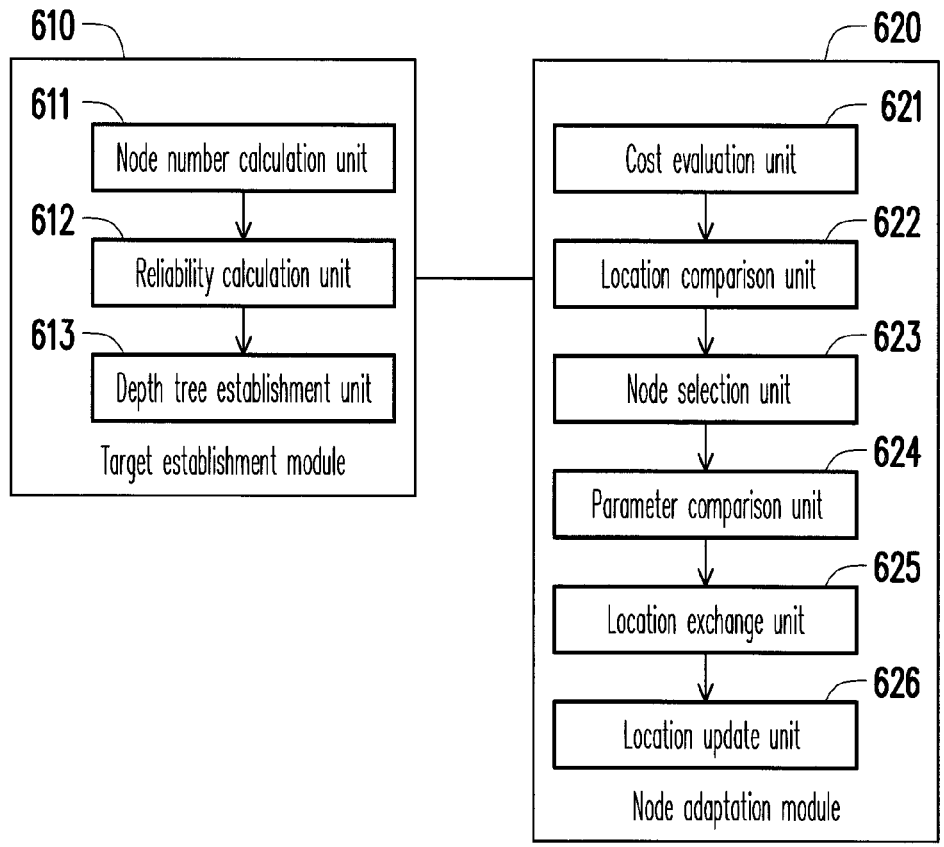
FIG. 6 is a block diagram of a system for transmitting a live media stream in P2P networks according to an embodiment of the disclosure.
Figure 7:
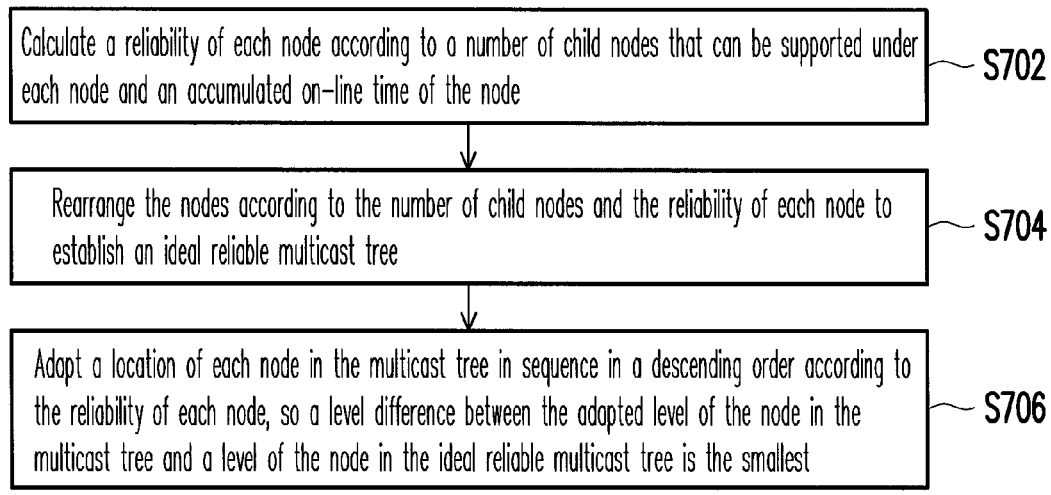
FIG. 7 is a flow chart of a method for transmitting a live media stream in P2P networks according to an embodiment of the disclosure.

FIG. 6 is a block diagram of a system for transmitting a live media stream in P2P networks according to an embodiment of the disclosure. FIG. 7 is a flow chart of a method for transmitting a live media stream in P2P networks according to an embodiment of the disclosure. Referring to FIGS. 6 and 7 at the same time, a transmission system 600 in this embodiment mainly includes a target establishment module 610 and a node adaptation module 620, which are suitable for managing a plurality of nodes under a multicast tree, so as to transmit a live media stream. Detailed steps of the transmission method in this embodiment are illustrated below.

First, the target establishment module 610 calculates a reliability of each node according to a number of child nodes that can be supported by each node and an accumulated on-line time of the node (Step S702), and next tentatively calculates an ideal reliable multicast tree established after the nodes are rearranged according to the number of child nodes and the reliability of each node (Step S704).

Specifically, the target establishment module 610 can be further divided into a node number calculation unit 611, a reliability calculation unit 612, and a depth tree establishment unit 613. For example, in the transmission system 600, the node number calculation unit 611 first calculates a number of child nodes that can be supported by each node, then quantifies the number of child nodes and the on-line time of each node into a bandwidth fraction and a time fraction respectively, and then respectively multiplies the bandwidth fraction and the time fraction by a corresponding weight value and calculates a sum to obtain the reliability of the node. Finally, the depth tree establishment unit 613 rearranges the nodes according to the number of child nodes and the reliability of each node to establish an ideal reliable multicast tree. The depth tree establishment unit 613, for example, takes a node having the greatest reliability as a parent node of the ideal reliable multicast tree, and joins rest nodes in a descending order in sequence as the child nodes under the parent node according to the reliabilities of the rest nodes, and the number of the child nodes is equal to the number of child nodes that can be supported by the parent node. Next, each child node serves as a parent node, and the rest nodes continue to be joined under each child node, until all nodes are joined, so the ideal reliable multicast tree is finished.

After target establishment module 610 finishes establishing the ideal reliable multicast tree, the node adaptation module 620 adapts a location of each node in the multicast tree in sequence in a descending order according to the reliability of each node, so a level difference between the adapted level of the node in the multicast tree and a level of the node in the ideal reliable multicast tree is the smallest (Step S706).

Specifically, when adapting the location of the node, for example, the node adaptation module 620 decides an adaptation order according to the reliability of each node, and the node having a higher reliability represents that the node may have longer on-line time and can support a larger number of child nodes, so if the node having a higher reliability is moved to an upper layer in the multicast tree, the overall structure of the multicast tree is less influenced, such that in this embodiment, the node having a higher reliability is adapted first. In addition, when adapting the location of the node, the node adaptation module 620 also refers to a level of the node in a previously established ideal reliable multicast tree, and adapts the location of the node to the level, so a level difference between the adapted level of the node in the multicast tree and the level of the node in the ideal reliable multicast tree is the smallest, thus achieving the objective of reducing the multicast tree depth and transmission delay of the disclosure.

It should be noted that in order to make the level difference between the adapted level of the node in the multicast tree and the level of the node in the ideal reliable multicast tree be the smallest, in this embodiment, the node adaptation module 620 is further divided into a cost evaluation unit 621, a location comparison unit 622, a node selection unit 623, a parameter comparison unit 624, a location exchange unit 625, and a location update unit 626, so as to select a suitable node for movement or exchange. Detailed illustration is given in further embodiments below.

Figure 8:
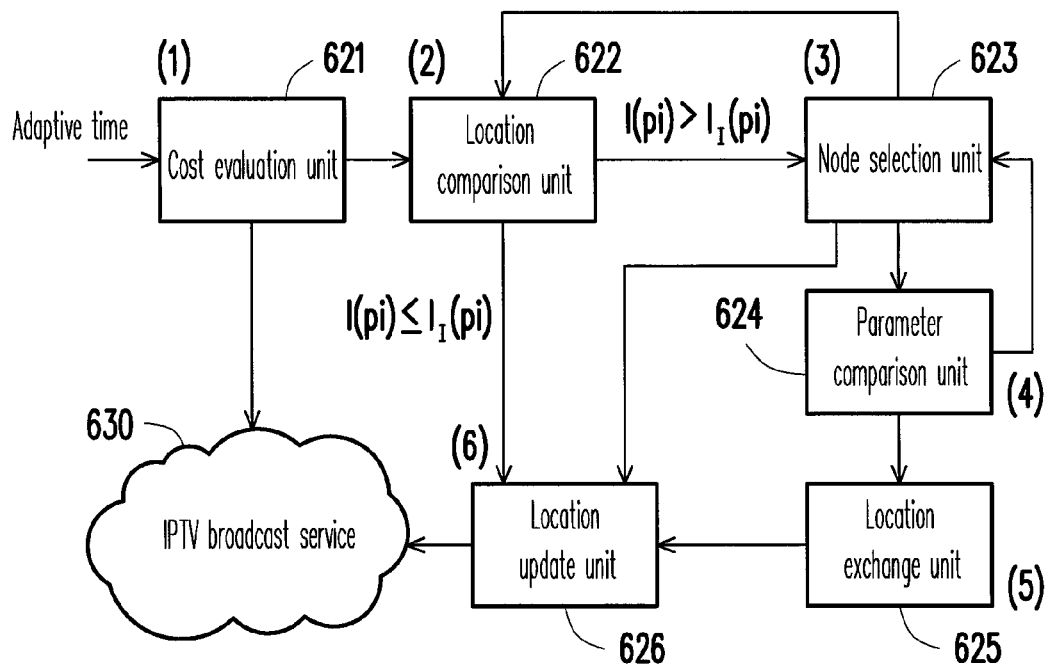
FIG. 8 is a flow chart of a node location adaptation method according to an embodiment of the disclosure.

FIG. 8 is a flow chart of a node location adaptation method according to an embodiment of the disclosure. Referring to FIG. 8, in this embodiment, the operation process of the method mainly includes six parts: (1) an initial state; (2) comparison with an ideal condition; (3) node selection; (4) parameter comparison; (5) node location exchange; and (6) node location update, and these parts are respectively performed by the cost evaluation unit 621, the location comparison unit 622, the node selection unit 623, the parameter comparison unit 624, the location exchange unit 625, and the location update unit 626 in the node adaptation module 620. Each part is illustrated in detail below.

(1) Initial State: It is assumed that the current multicast tree has m nodes, and in the process of transmitting the live media stream, when a periodic adaptive time is reached, the cost evaluation module 621 first evaluates an update cost, calculates an improved delay time of the multicast tree after update and adaptation, and compares the improved delay time with the connection time required for adapting the locations of nodes in the multicast tree. If the improved delay time after update is not greater than the connection time required for adapting the locations of nodes in the multicast tree, the location of the node is not updated, and the current multicast tree structure is directly adopted to receive the IPTV broadcast service 630. When the improved delay time is greater than the connection time required for adapting the locations of the nodes in the multicast tree, the location comparison unit 622 starts the adaptation of the locations of the nodes. In the beginning of adapting the locations of the nodes, the location comparison unit 622 gives numbers $p_i(\forall i \in [0,m])$ to the m nodes according to the reliabilities thereof. The node having a higher reliability is numbered smaller, and during adaptation, the location is individually adapted according to a number order of the node (numbers being ascending), and at the same time an ideal reliable multicast tree can be established according to the node number order and the node bandwidth load capacity to serve as an ideal condition of the system in which a multicast tree can be established currently.

(2) Comparison with Ideal Condition: after the above establishment step, each node $p_i$ has two "location" parameters: a level $l(p_i)$ that the node is practically at in the multicast tree in the system and a level $l_f(p_i)$ that the node is at in the ideal multicast tree, and the level can be regarded as an "ideal location" of the node. Here, in this step, the location comparison unit 622 first compares whether the practical level $l(p_i)$ of the node is greater than the ideal location $l_f(p_i)$, if yes, it represents that the location of the node is not ideal yet, so the node $p_i$ can enter a node selection step (3) to further adapt the location, and on the contrary, if the $l(p_i)$ is smaller than or equal to $l_f(p_i)$, the node $p_i$ directly enters the node location update step (6), and waits for updates of other nodes.

(3) Node Selection: if in the previous step it is already judged that the location of the node does not achieve the "ideal location" yet, the node enters a node selection mode, and the steps in this part are as follows. (i) First, a node selection unit 623 selects an upper level node of an ideal location to perform an action of joining to become child nodes, and the objective is to update the node $p_i$ to an ideal location level through joining. (ii) If upper layer nodes of the ideal location are already fully loaded, the node selection unit 623 selects a node $p_j$ currently at the ideal location level instead and performs a parameter comparison step (4) and a node location exchange step (5), and the objective of this step is mainly to update the node $p_i$ to the ideal level by comparing the parameter fractions of the two nodes and through exchange. (iii) If the fractions of the nodes at the ideal level are all higher than that of the node $p_i$, the node selection unit 623 descends the ideal location by a level instead, and returns to the comparison step (2) in the ideal condition, so as to perform the location comparison step and the node location update steps (i) and (ii), until the ideal level is equal to the level of the node.

(4) Parameter Comparison: The main objective of this step is that the parameter comparison unit 624 performs comparison of parameter fractions before location exchange for the node $p_j$ selected in Step (ii) in the selection step (3) and the node p_i to be updated, and the objective of the comparison is to adapt nodes having relatively high reference parameter fraction values to upper layer locations of the multicast tree. In the aspect of the parameter fractions, three parameters including a bandwidth, an on-line time, and a delay of the node are considered. However, as the node delay is a relative parameter, in the comparison mode, the parameter is considered in two stages as follows. (i) First, the parameter comparison unit 624 compares reliabilities of two nodes, in which if the reliability of a lower layer node is greater than that of an upper layer node, the delay parameter is added. The definition of the delay parameter is that in the comparison result of the parameters before and after the exchange. If the upper and lower layer nodes after exchange have a smaller total delay, the exchange of the two nodes is supported, so a delay parameter $D(p_i)$ of the lower layer node $p_i$ is defined as a positive value, and a delay parameter $D(p_j)$ of the upper layer node $p_j$ is a negative value, and vice versa. (ii) After the delay parameters of the nodes are obtained, the parameter comparison unit 624 compares priority values Priority(pi) of the two nodes, if the priority value of the lower layer node is greater than the priority value of the upper layer node, the nodes enter a node location exchange step (5) to exchange the locations of the two nodes. The priority values Priority(pi) are used for representing a combined parameter of the bandwidth, on-line time, and relative delay of the node, the calculation formula of which is as follows:

$$\text{Priority}(p_i) = \beta \times \text{Reliability}(p_i) + (1-\beta) \times D(p_i)$$

where β is an adjustable weight constant value, and the Reliability($p_i$) is the reliability of the node pi.

(5) Node Location Exchange: The objective of this part is mainly to perform an action of exchanging locations of nodes when an exchange condition in the parameter compare step (4) is satisfied, the main process is as follows. (i) The location exchange unit 625 judges whether a vertical transmission relationship (for example, parent and child nodes) exists between the current node and the target node, if the vertical transmission relationship does not exist between the exchange nodes, the locations are directly exchanged. (ii) If the vertical transmission relationship exists between the exchange nodes, the location exchange unit 625 considers whether the lower layer node $p_i$ has the capacity of supporting a new node. If the location exchange unit 625 judges that the lower layer node $p_i$ is not able to support the new node, after exchange, the upper layer node $p_j$ should perform an action of joining again. (iii) In addition, in order to avoid changes of the child node in the process of changing the locations of the nodes, connection between all child nodes of the nodes that join the exchange and the original parent node needs to be kept.

(6) Node Location Update: The final part is that after the above steps are performed on all nodes in the multicast tree, the location update unit 626 reconnects the parent node and performs broadcast according to the update result of each node. The objective of unified reconnection is mainly to reduce a phenomenon of jumping pictures due to node update.

Figure 9A:
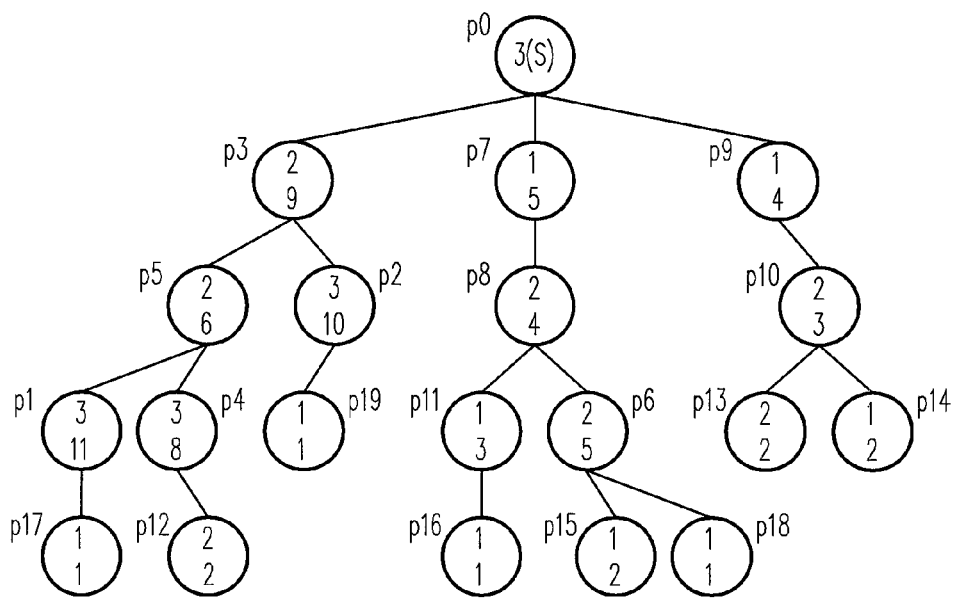
FIGS. 9A to 9R are examples of adapting a location of a node in a multicast tree according to an embodiment of the disclosure.
Figure 9B:
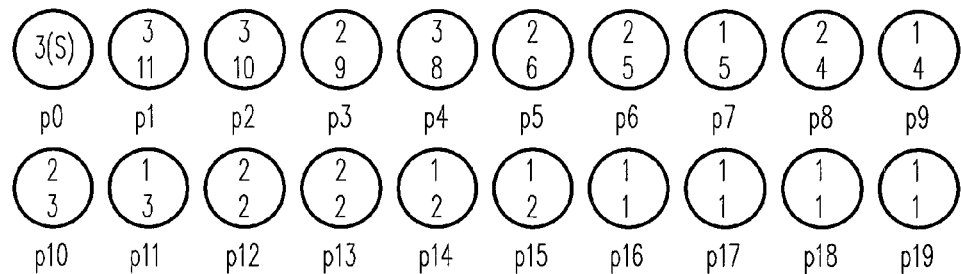
Figure 9B:
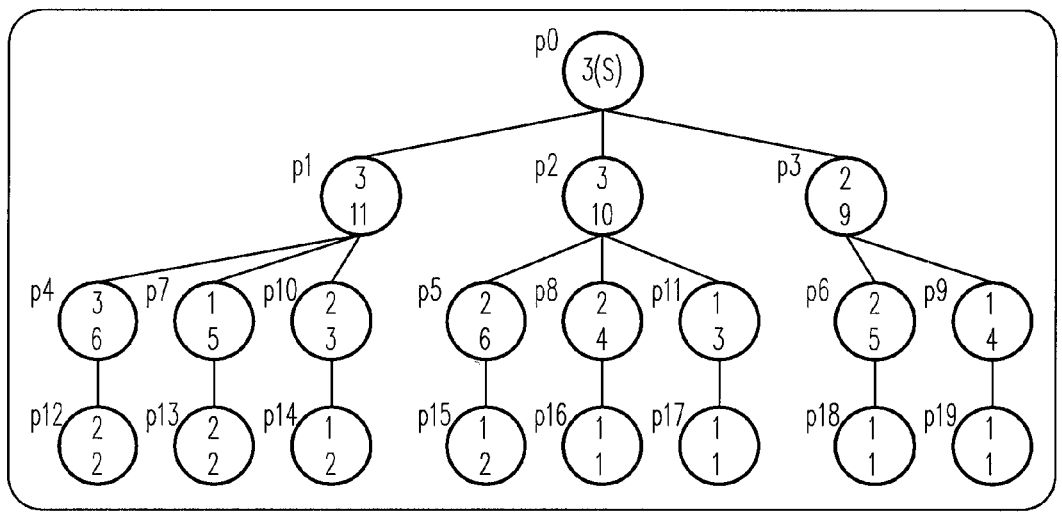
Figure 9C:
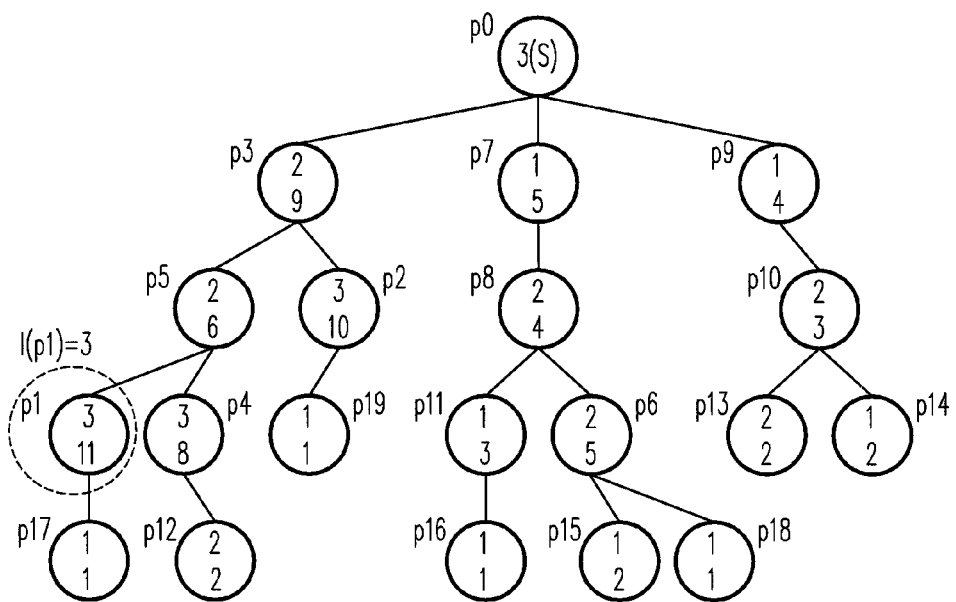
Figure 9D:
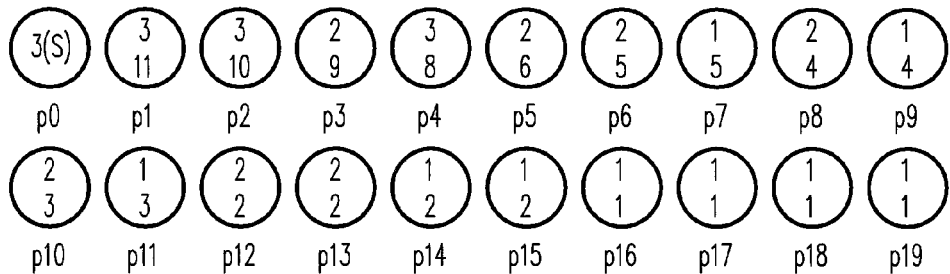
Figure 9D:
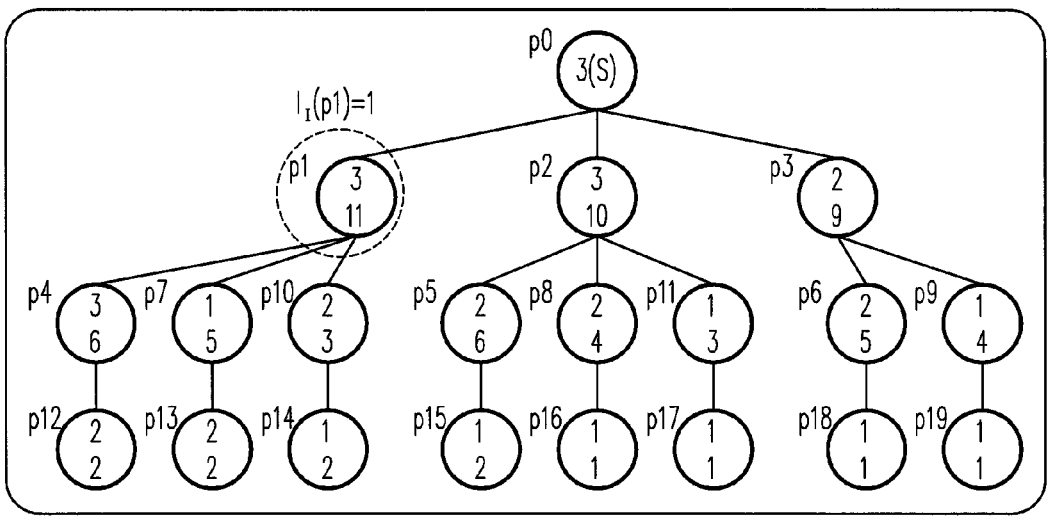
Figure 9E:
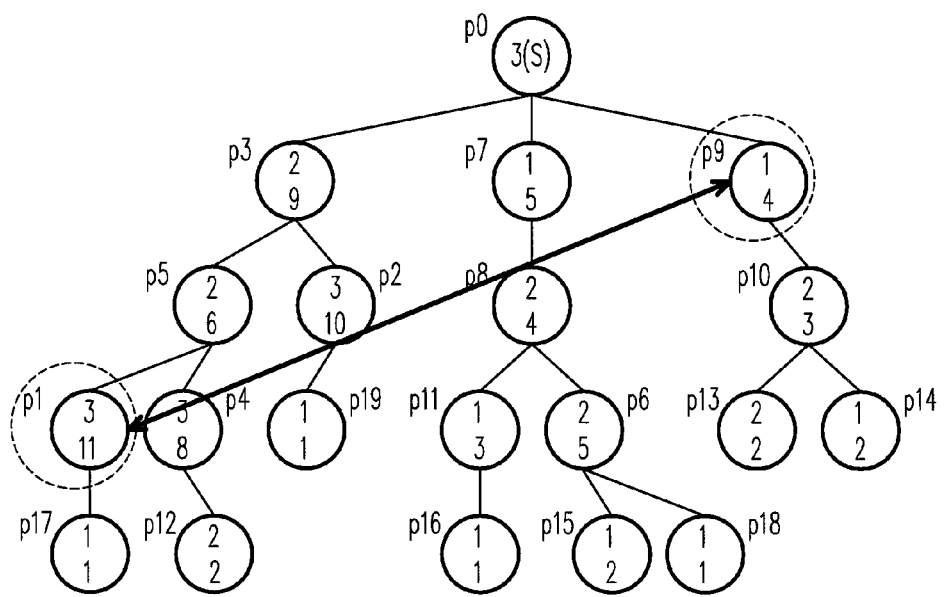
Figure 9F:
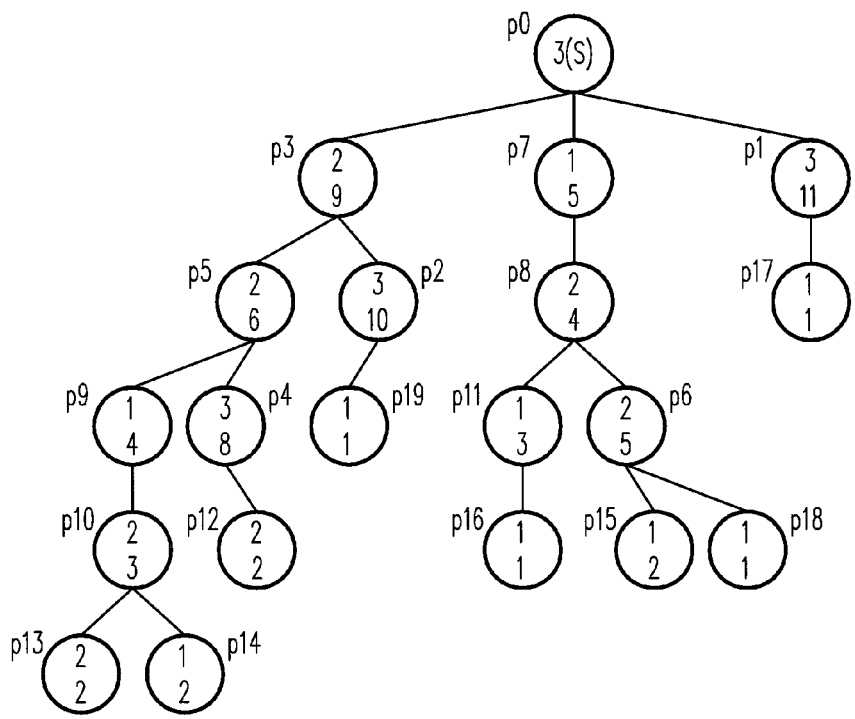
Figure 9G:
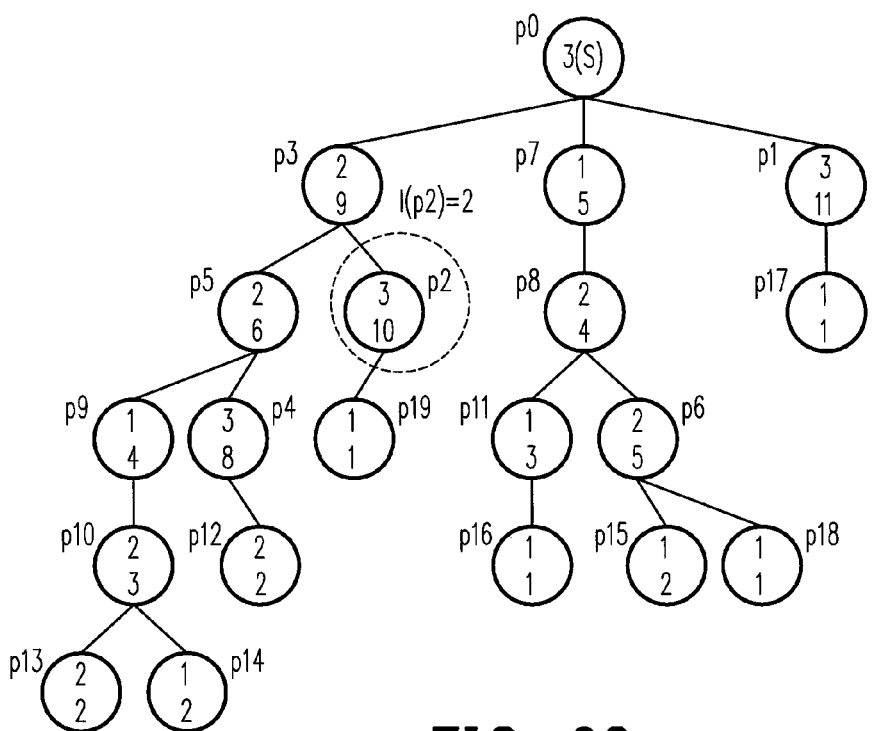
Figure 9H:
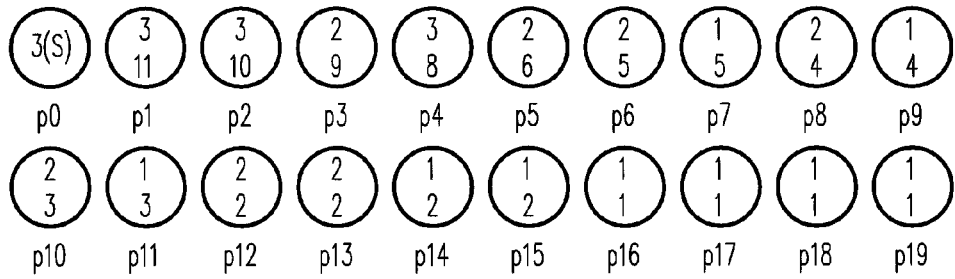
Figure 9H:
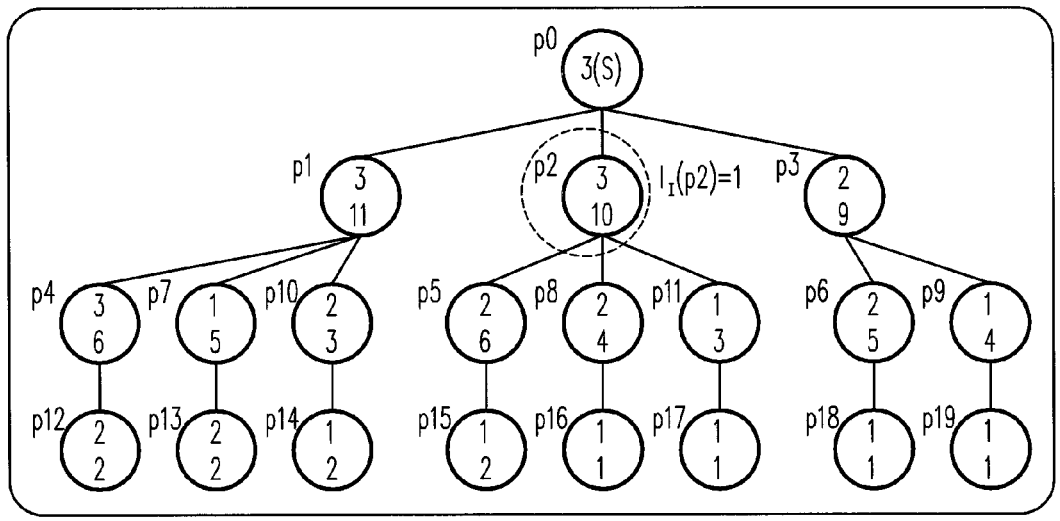
Figure 9I:
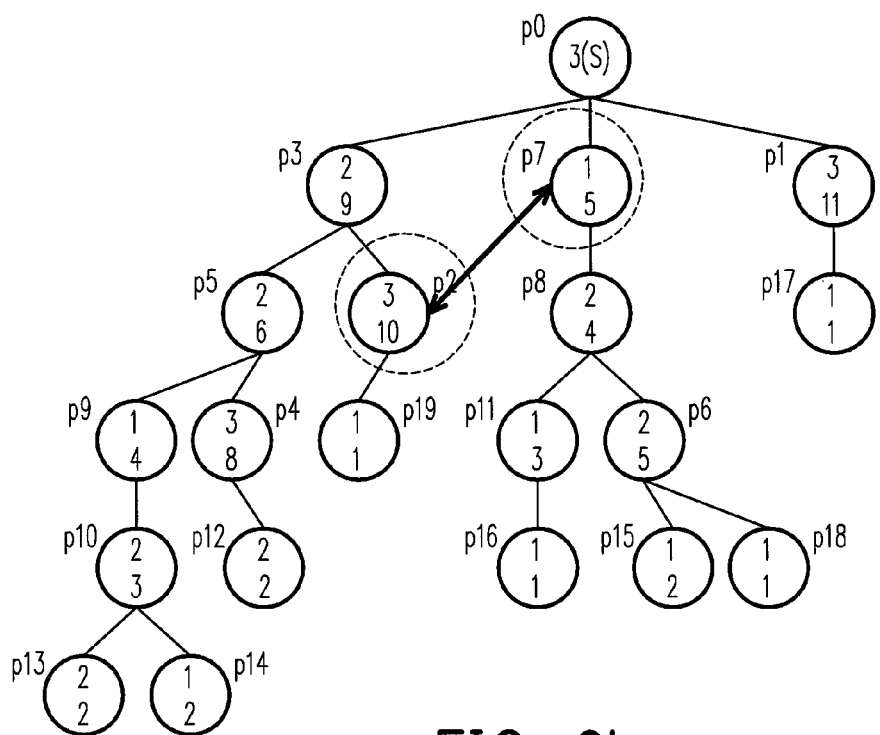
Figure 9J:
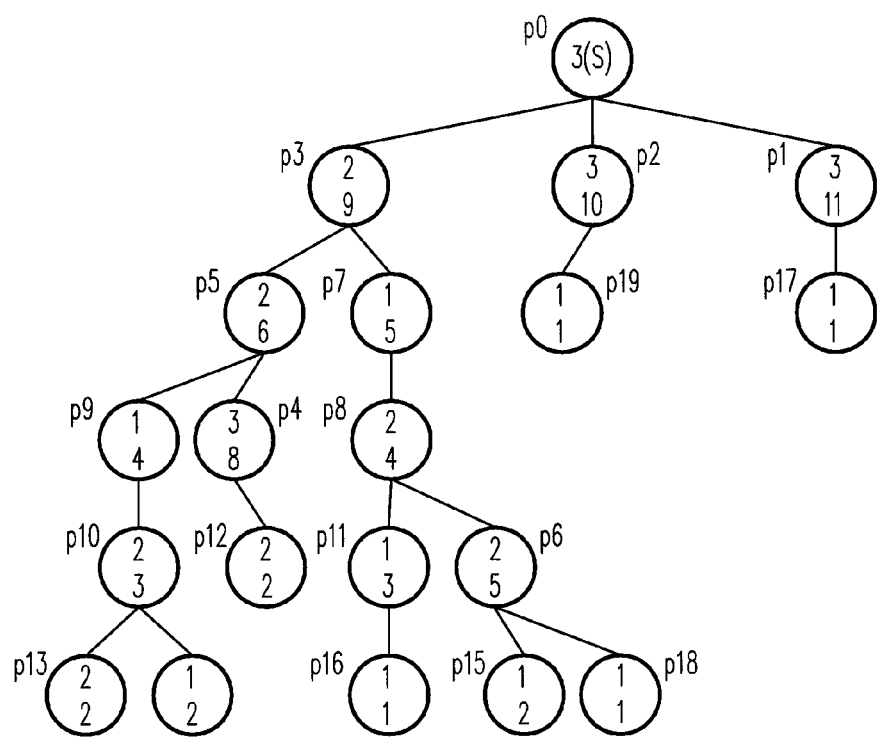
Figure 9K:
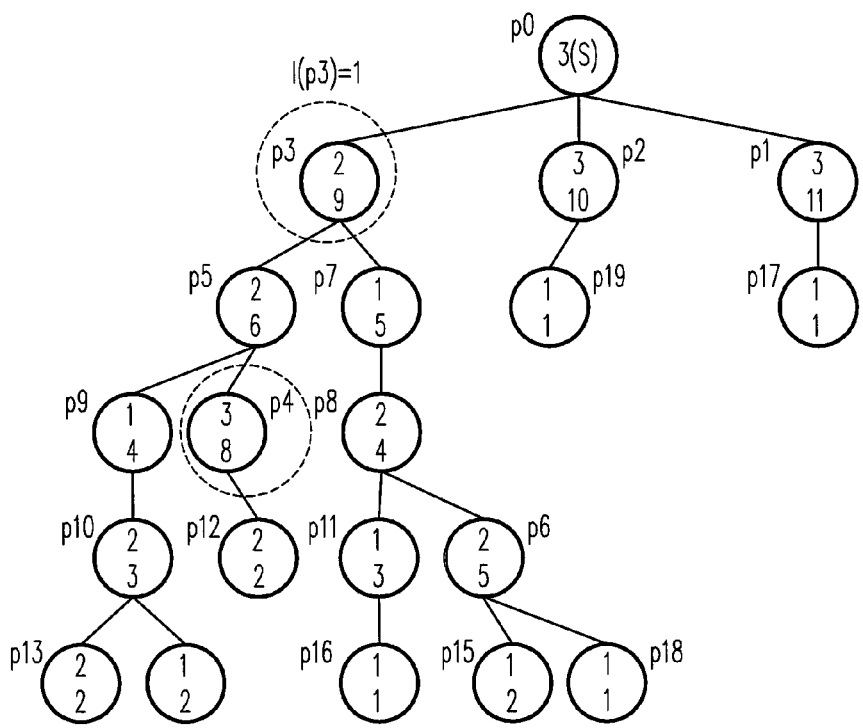
Figure 9L:
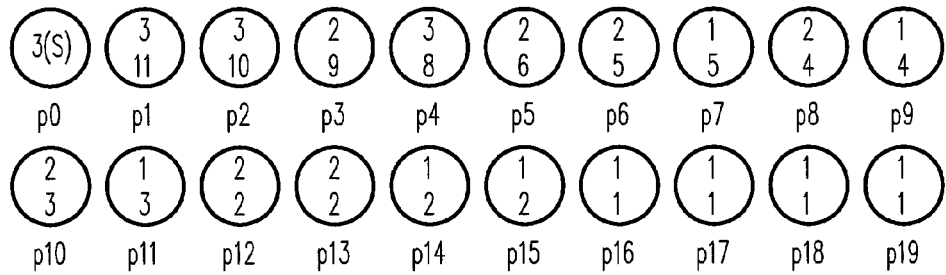
Figure 9L:
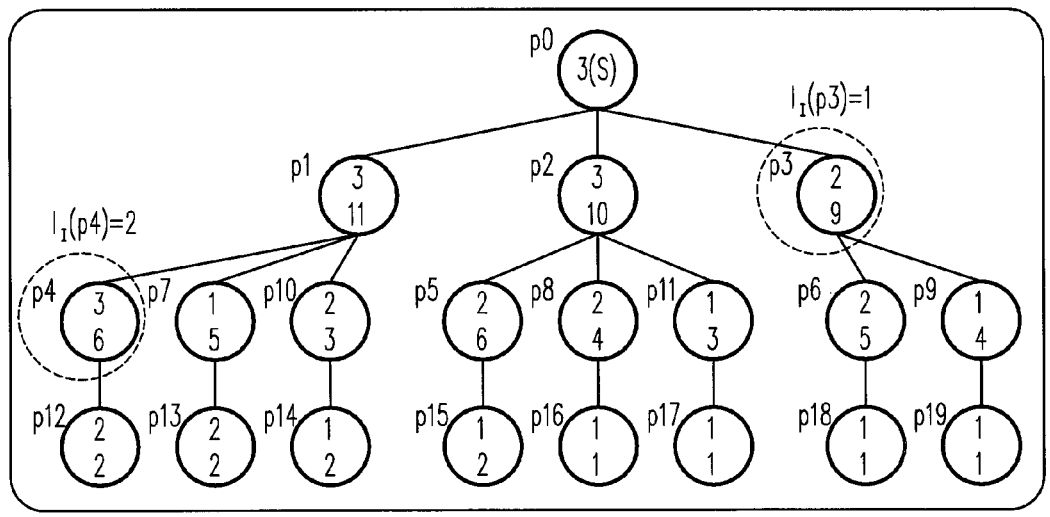
Figure 9M:
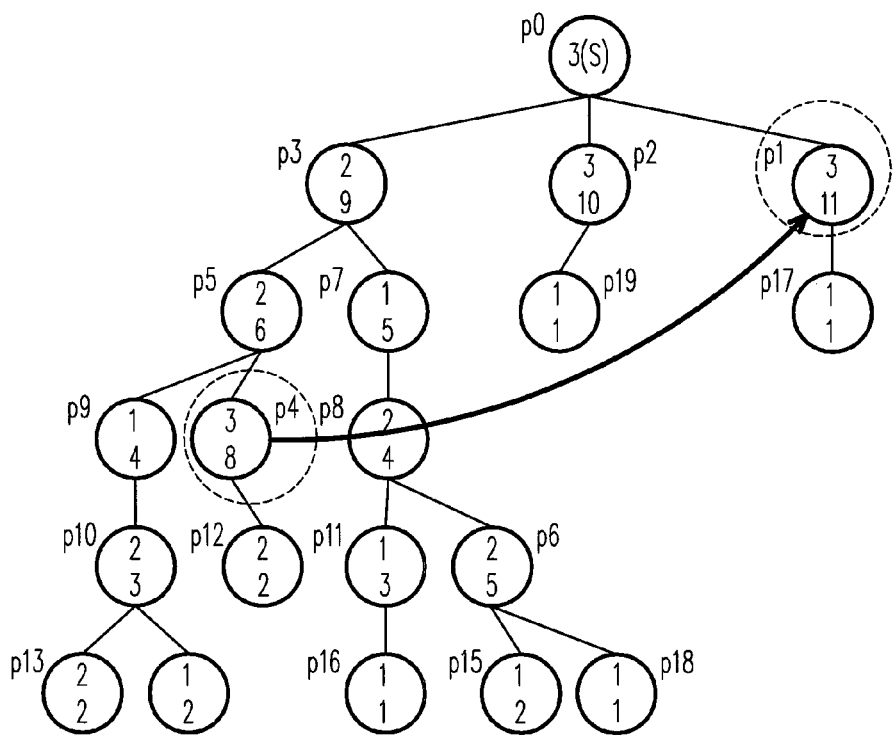
Figure 9N:
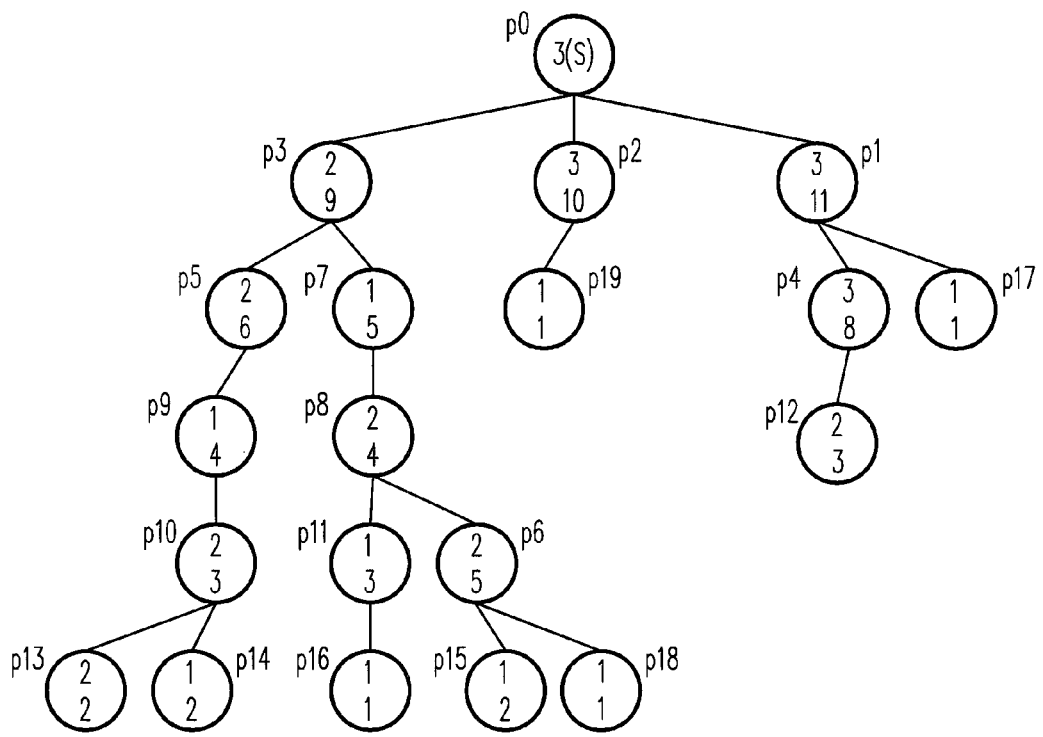
Figure 9O:
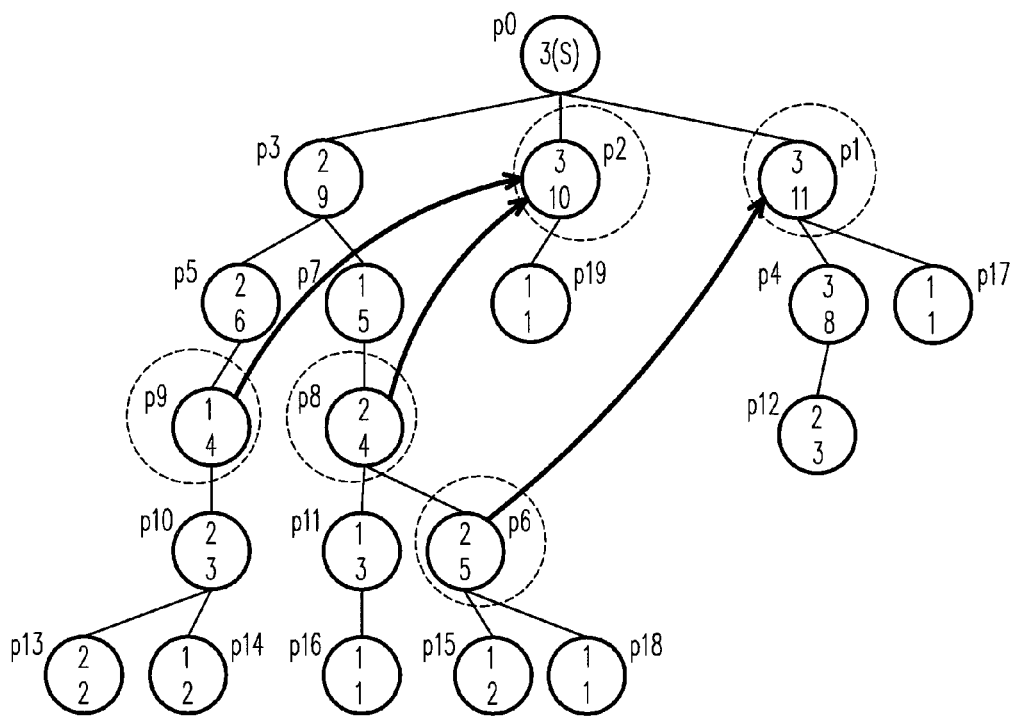
Figure 9P:
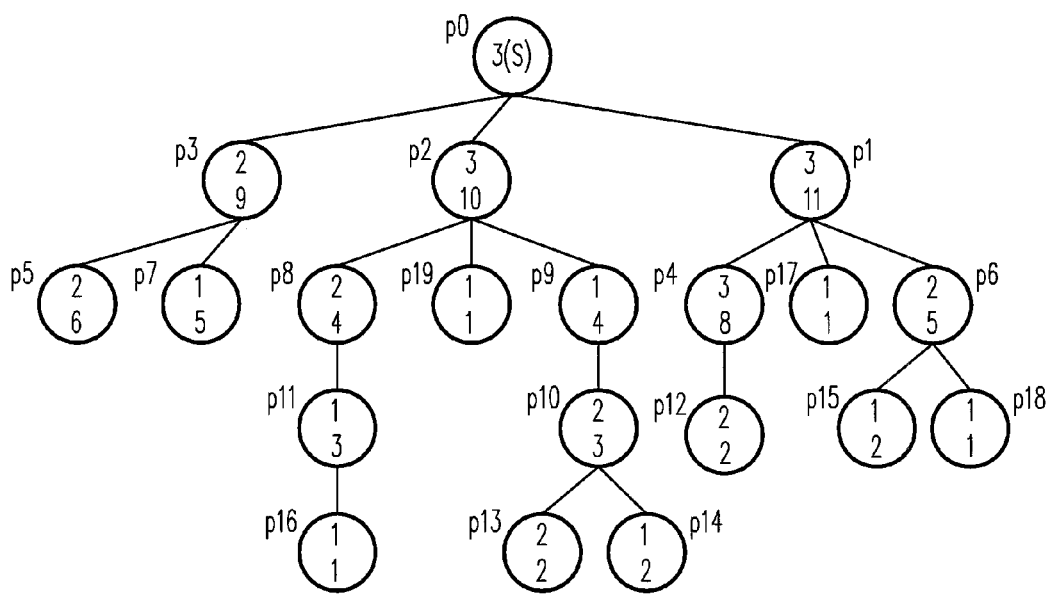
Figure 9Q:
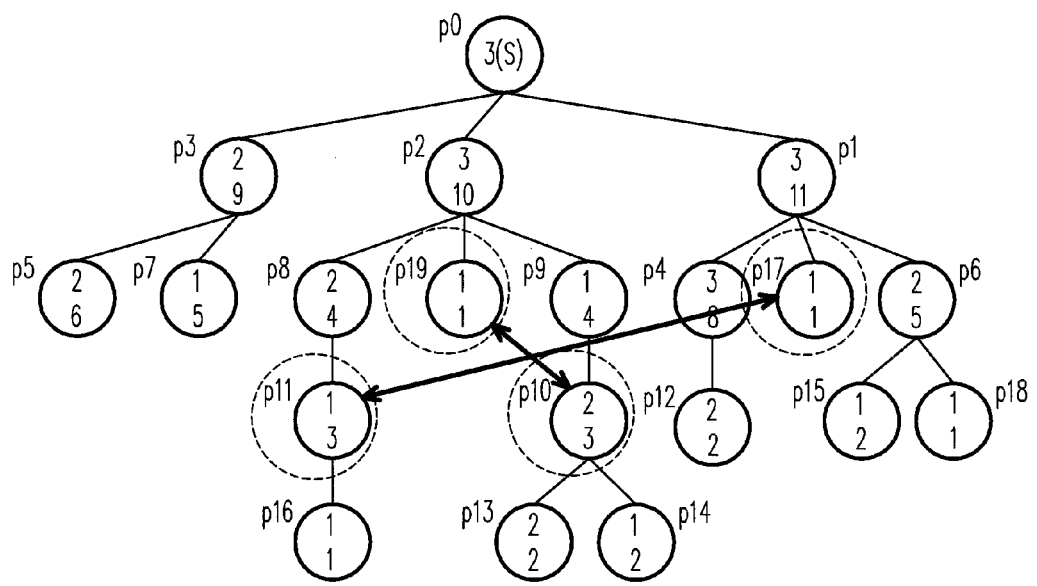
Figure 9R:
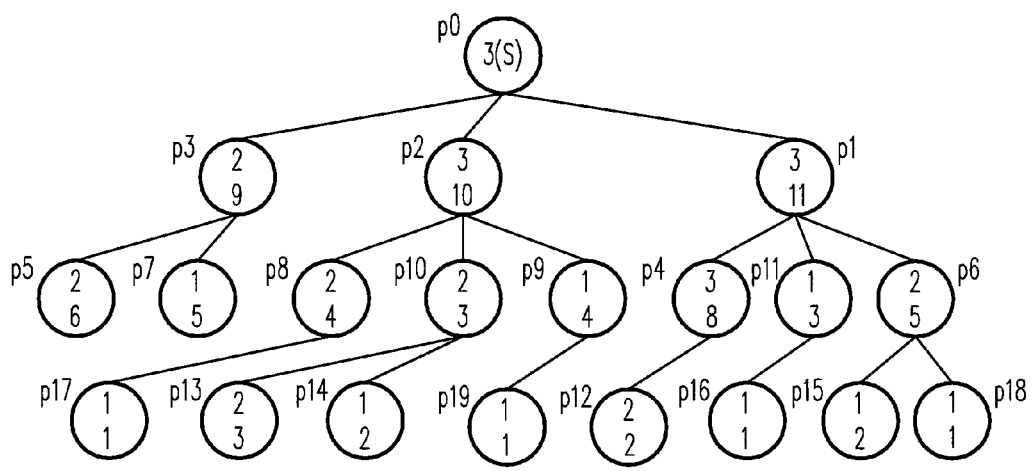

FIGS. 9A to 9R are examples of adapting a location of a node in a multicast tree according to an embodiment of the disclosure. FIG. 9A depicts an original multicast tree of the system, and all nodes in the original multicast tree are numbered as p0 to p19 in sequence according to reliabilities thereof. A number above of each node p0 to p19 represents the number of child nodes that can be supported by the node, and a number below represents the reliability of the node, and according to the number of child nodes that can be supported and the reliability of the nodes p0 to p19, the nodes p0 to p19 can be rearranged to establish an ideal reliable multicast tree as an ideal condition (as shown in FIG. 9B). In the following, locations of the nodes p0 to p19 in the original multicast tree are adapted in sequence according to an order, so a level difference between the adapted level of the node in the original multicast tree and a level of the node in the ideal reliable multicast tree is the smallest.

Adaptation of node p0: as shown in FIG. 9C, the node p0 is at an uppermost layer of the original multicast tree, so the location thereof is not adapted.

Adaptation of node p1: in the original multicast tree depicted in FIG. 9C, a level number of the node p1 is 3, but in the ideal multicast tree depicted in FIG. 9D, the level number is 1. At this time the system first finds a node p0 at an upper level of the first level (that is, a 0th level) in the original multicast tree to join the node p1 as a child node. However, as the number of child nodes that the node p0 can support is already full, the node p9 at the first level in the original multicast tree is found instead, the locations of the node p9 and the node p1 are exchanged (as shown in FIG. 9E), and the adaptation result is as shown in FIG. 9F. The node p9 is the node having the smallest reliability among all nodes at the first level in the original multicast tree as depicted in FIG. 9E.

Adaptation of node p2: a level number of the node p2 in the original multicast tree as depicted in FIG. 9G is 2, but the level number in the ideal multicast tree as depicted in FIG. 9H is 1. Similarly, the system first finds a node p0 at an upper level of the first level (that is, the 0th level) in the original multicast tree to join a node p1 as the child node. However, as the number of child nodes that the node p0 can support is already full, the node p7 at the first level in the original multicast tree is found instead, and the locations of the node p7 and the node p2 are exchanged (as shown in FIG. 9I), and the adaptation result is as shown in FIG. 9J. The node p7 is the node having the smallest reliability among all nodes at the first level in the original multicast tree as depicted in FIG. 9I.

Adaptation of node p3: A level number of the node p3 in the multicast tree as depicted in FIG. 9K is 1, and the level number in the ideal multicast tree as depicted in FIG. 9L is also 1, so the location thereof is not adapted.

Adaptation of node p4: a level number of the node p4 in the multicast tree as depicted in FIG. 9K is 3, and the level number in the ideal multicast tree as depicted in FIG. 9L is 2, so the system first finds the node p1 at an upper level of the second level (that is, the 1st level) in the original multicast tree to join the node p4 as a child node (as shown in FIG. 9M), and the adaptation result is as shown in FIG. 9N. The node p7 is the node having the greatest reliability among all nodes at the first level in the original multicast tree as depicted in FIG. 9M.

Adaptation of node p5: a level number of the node p4 in the multicast tree as depicted in FIG. 9K is 3, and the level number in the ideal multicast tree as depicted in FIG. 9L is 2, so the system first finds the node p1 at an upper level of the second level (that is, the 1st level) in the original multicast tree to join the node p4 as a child node (as shown in FIG. 9M), and the adaptation result is as shown in FIG. 9N. The node p7 is the node having the greatest reliability among all nodes at the first level in the original multicast tree as depicted in FIG. 9M.

Adaptation of nodes p6 to p9: according to the rules, as can be seen from the multicast tree as depicted in FIG. 9Q, the node p6 is adapted to be a child node of the node p1, a location of the node p7 is not adapted, the nodes p8 and p9 are both adapted to be child nodes of the node p2, and the adaptation result is as shown in FIG. 9P.

Adaptation of nodes p10 to p11: according to the rules, as can be seen from the multicast tree as depicted in FIG. 9Q, the locations of the node p10 and the node p19 are exchanged, the locations of the node p11 and the node p17 are exchanged, and the adaptation result is as shown in FIG. 9R.

Through the adaptation steps, the system already successfully adapts the multicast tree from the original multicast tree as depicted in FIG. 9A to the multicast tree as depicted in FIG. 9R, and successfully reduces the depth of the multicast tree from 5 levels (that is, levels 0 to 4) to 4 levels (that is, levels 0 to 3).

As for the Leave Mode, in the mode, in order to reduce the number that grandchild nodes find new parent nodes again, the system uses a parent node of a disconnected node as a new parent node of a child node, and a grandchild node having no direct connection relationship with the disconnected node keeps the original parent node.

Figure 10A:
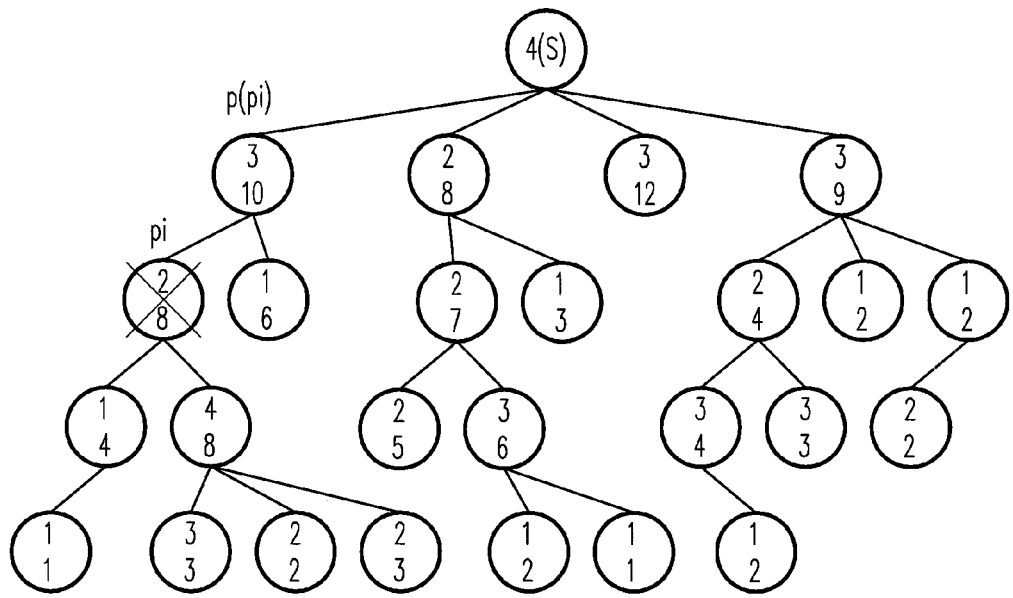
FIGS. 10A to 10F are examples of a Join Mode according to an embodiment of the disclosure.
Figure 10B:
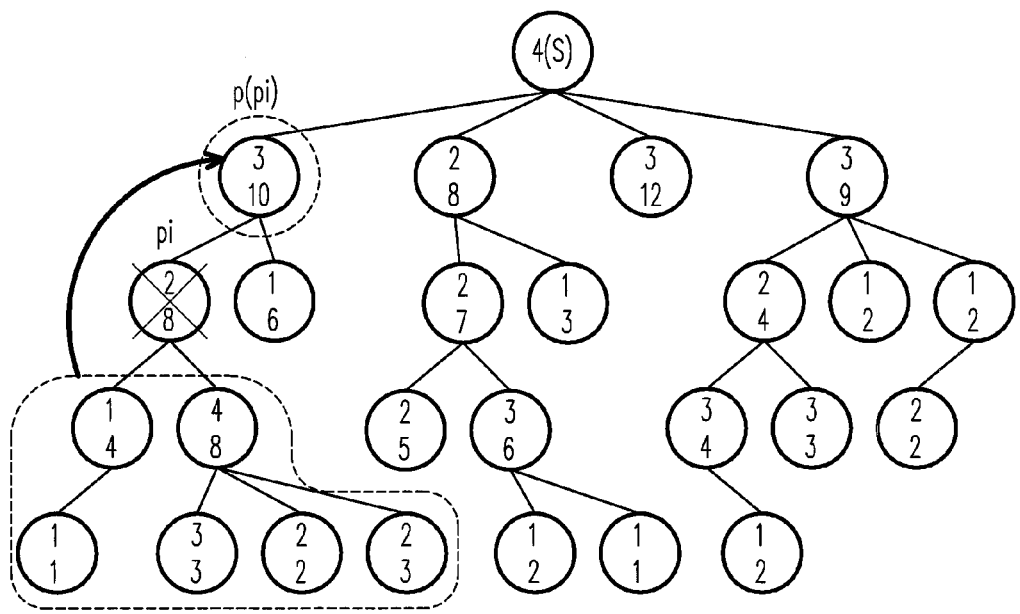
Figure 10C:
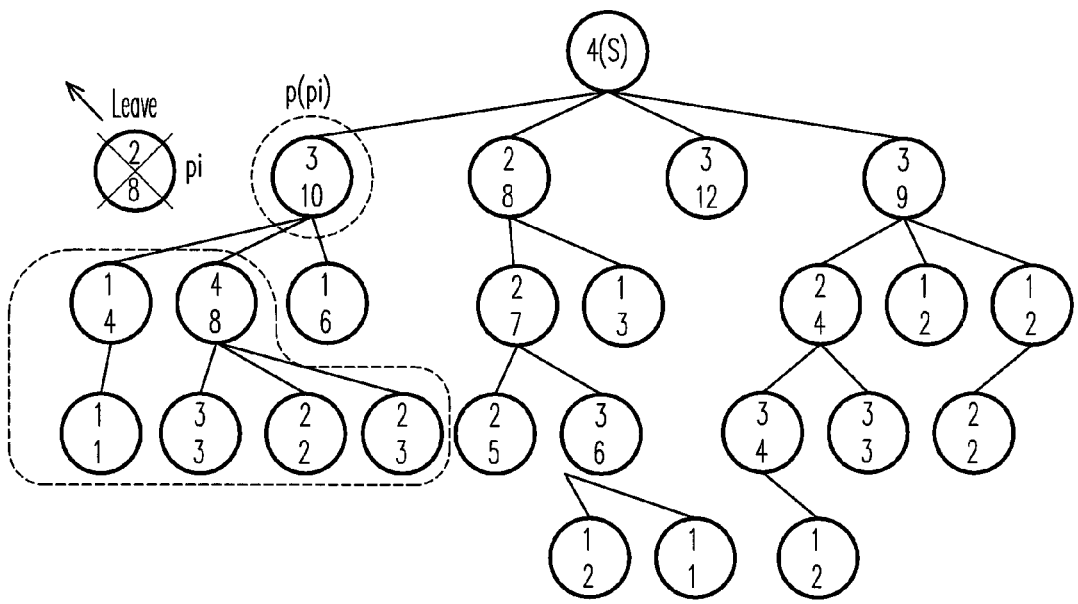
Figure 10D:
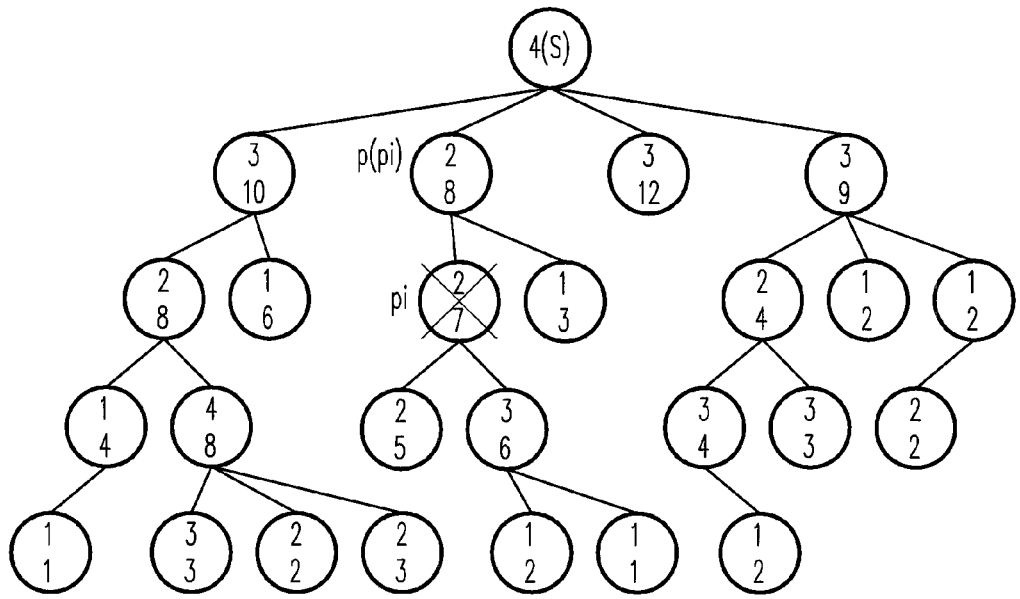
Figure 10E:
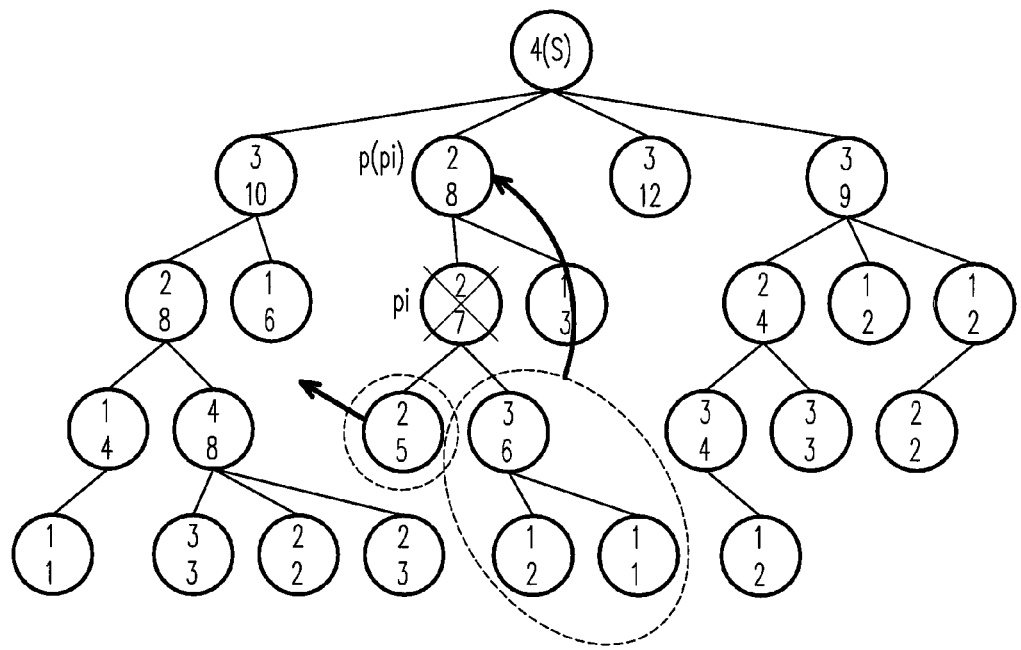
Figure 10F:
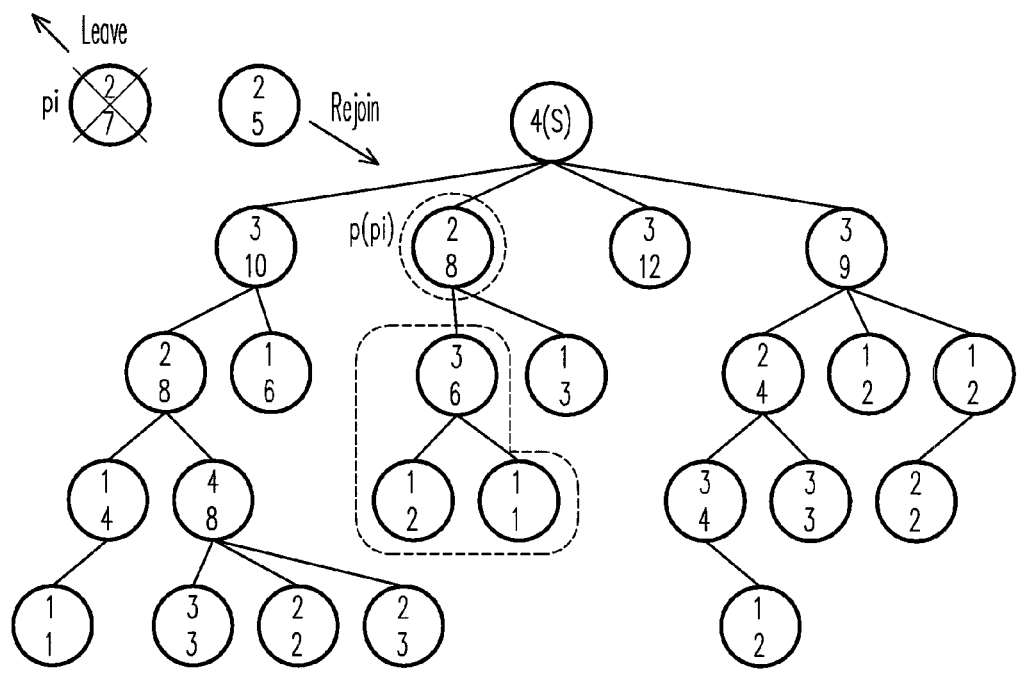

For example, FIGS. 10A to 10F are examples of a Join Mode according to an embodiment of the disclosure. Referring to FIG. 10A first, if a parent node p(p$_i$) of a currently disconnected node p$_i$ still has a capacity of supporting all child nodes of the node p$_i$ after the node p$_i$ is disconnected, all the child nodes of the node p$_i$ use the p(p$_i$) as a new parent node thereof (as shown in FIG. 10B). For a grandchild node having no direct connection relationship with the p$_i$, an original parent node is kept (as shown in FIG. 10C). In addition, if the parent node p(p$_i$) of the disconnected node p$_i$ does not have the capacity of supporting all child nodes of the node p$_i$ after the node pi is disconnected (as shown in FIG. 10D), the system selects nodes that the p(p$_i$) can still support from all child nodes of the node p$_i$ as new child nodes of the p(p$_i$) (as shown in FIG. 10E), and the rest child nodes of the node p$_i$ that the parent node p(p$_i$) is unable to support enter a Join Mode again, so as to select a new parent node, and all grandchild nodes having no direct connection relationship with the node p$_i$ keep the original parent node (as shown in FIG. 10F).

In conclusion, in a method for transmitting a live media stream in P2P networks of the disclosure, a location of a multicast tree node is dynamically adapted using a node bandwidth, a on-line time, and a relative delay as a reference, and in the adaptation process a hop update mode is adopted, thus solving a possible "transmission bottleneck" due to different sequences of adding nodes in a tree-based P2P network, reducing a node disconnection frequency in a multicast tree, and increasing a stability of media transmission.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for transmitting a live media stream in peer-to-peer (P2P) networks, suitable for a server transmitting a live media stream to a plurality of nodes under a multicast tree, comprising:

calculating a reliability of each of the nodes according to an accumulated on-line time of the node and a number of child nodes that are able to be supported by the node by the server;

rearranging the nodes according to the number of child nodes and the reliability of each of the nodes by the server to establish an ideal reliable multicast tree, wherein the nodes are arranged in a descending order according to the reliabilities of the nodes in the ideal reliable multicast tree, and the nodes at upper level of the ideal reliable multicast tree has greater reliability; and adapting a location of each of the nodes in the multicast tree in sequence in a descending order according to the reliability of the node by the server, so a level difference between an adapted level of the node in the multicast tree and a level of the node in the ideal reliable multicast tree is the smallest.

2. The method for transmitting a live media stream in P2P networks according to claim 1, wherein before the step of adapting the location of each of the nodes in the multicast tree in sequence in a descending order according to the reliability of the node by the server, so the level difference between the adapted level of the node in the multicast tree and the level of the node in the ideal reliable multicast tree is the smallest, and the method further comprises:

when a periodic adaptive time is reached, evaluating an adapted improved delay time after reconnection for adapting locations of the nodes in the multicast tree; and if the adapted improved delay time after reconnection is smaller than a delay time without reconnection, adapting the locations of the nodes in the multicast tree.

3. The method for transmitting a live media stream in P2P networks according to claim 1, wherein before the step of calculating the reliability of each of the nodes according to the number of child nodes that are able to be supported by each of the nodes and the accumulated on-line time of the node by the server, the method further comprises:

subtracting a currently used bandwidth from a maximum bandwidth that each of the nodes is able to support, so as to obtain a rest bandwidth;

dividing the rest bandwidth by a bit rate of the live media stream, so as to estimate an extra number of nodes that the node is able to support; and adding the extra number of nodes of the node to the number of child nodes already connected under the node, so as to obtain the number of child nodes that are able to be supported by the node.

4. The method for transmitting a live media stream in P2P networks according to claim 1, wherein the step of calculating the reliability of each of the nodes according to the number of child nodes that is able to be supported by each of the nodes and the accumulated on-line time of the node by the server comprises:

quantifying the number of child nodes and the on-line time of each of the nodes into a bandwidth fraction and a time fraction respectively; and multiplying the bandwidth fraction and the time fraction by a corresponding weight value respectively and calculating a sum, so as to obtain the reliability of the node.

5. The method for transmitting a live media stream in P2P networks according to claim 1, wherein the step of rearranging the nodes according to the number of child nodes and the reliability of each of the nodes by the server to establish the ideal reliable multicast tree comprises:

taking a node having the greatest reliability as a parent node of the ideal reliable multicast tree;

joining the rest nodes as at least a child node under the parent node in sequence in a descending order according to the reliabilities of the rest nodes, wherein a number of the at least a child node is equal to the number of child nodes that are able to be supported by the parent node; and repeating the previous step, taking the at least a child node as a parent node, and continuing joining the rest nodes under the at least a child node, until all the nodes are joined, thus finishing the ideal reliable multicast tree.

6. The method for transmitting a live media stream in P2P networks according to claim 1, wherein the step of adapting the location of each of the nodes in the multicast tree in sequence in a descending order according to the reliability of the node by the server, so the level difference between the adapted level of the node in the multicast tree and the level of the node in the ideal reliable multicast tree is the smallest comprises:

comparing a current level of a current node currently to be adapted in the multicast tree with an ideal level of the current node in the ideal reliable multicast tree;

if the current level is greater than the ideal level, adapting the location of the node; and if the current level is smaller than or equal to the ideal level, not adapting the location of the node.

7. The method for transmitting a live media stream in P2P networks according to claim 6, wherein the step of adapting the location of the node by the server comprises:

selecting one of at least a node at an upper level of the ideal level in the multicast tree as a target node, and completely moving the current node and all the child nodes thereof under the target node to be child nodes of the target node.

8. The method for transmitting a live media stream in P2P networks according to claim 7, wherein the step of selecting one of the at least a node at an upper level of the ideal level in the multicast tree as the target node, and completely moving the current node and all the child nodes thereof under the target node to be the child nodes of the target node further comprises:

judging whether all nodes at the upper level of the ideal level are already fully loaded;

if the nodes are not fully loaded, completely moving the current node and all child nodes thereof under the target node to be the child nodes of the target node; and if the nodes are already fully loaded, selecting one of the at least a node at the ideal level in the multicast tree as the target node, and exchanging locations of the current node and the target node.

9. The method for transmitting a live media stream in P2P networks according to claim 8, wherein the step of selecting one of the at least a node at the ideal level in the multicast tree as the target node, and exchanging locations of the current node and the target node further comprises:

judging whether reliabilities of all of the nodes at the ideal level are higher than the reliability of the current node;

if the reliabilities of certain nodes are smaller than or equal to the reliability of the current node, selecting the node as the target node, and exchanging locations of the current node and the target node; and if the reliabilities of all of the nodes are greater than the reliability of the current node, descending the ideal level by one level, and performing the steps again until the ideal level is equal to the current level of the node.

10. The method for transmitting a live media stream in P2P networks according to claim 8, wherein the step of selecting one of the at least a node at the ideal level in the multicast tree as the target node, and exchanging locations of the current node and the target node further comprises:

comparing total delay parameters before and after the exchange of the locations of the current node and the target node;

if the total delay parameter after exchange is smaller than the total delay parameter before exchange, exchanging the locations of the current node and the target node; and if the total delay parameter after exchange is greater than or equal to the total delay parameter before exchange, not exchanging the locations of the current node and the target node.

11. The method for transmitting a live media stream in P2P networks according to claim 8, wherein the step of selecting one of the at least a node at the ideal level in the multicast tree as the target node, and exchanging the locations of the current node and the target node further comprises:

judging whether a vertical transmission relationship exists between the current node and the target node; and exchanging the locations of the current node and the target node, wherein if the vertical transmission relationship exist, a step of judging whether the current node is able to support a new node is performed, wherein if the current node is unable to support the new node, joining the target node to the multicast tree again after the locations of the current node and the target node are exchanged.

12. The method for transmitting a live media stream in P2P networks according to claim 1, wherein the step of adapting the location of each of the nodes in the multicast tree in a descending order in sequence according to the reliability of the node by the transmission system further comprises:

reconnecting the nodes in the multicast tree according to an adaptation result of each of the nodes; and transmitting the live media stream to the reconnected nodes.

13. The method for transmitting a live media stream in P2P networks according to claim 1, further comprising:

when a new node joins the multicast tree, searching for one of at least a node which are not fully loaded in the multicast tree as a target node, so as to join the new node as a child node of the target node.

14. The method for transmitting a live media stream in P2P networks according to claim 1, wherein the target node under which the new node joins is a searched node having the highest level and the greatest reliability among the at least a node.

15. The method for transmitting a live media stream in P2P networks according to claim 1, further comprising:

when an old node leaves the multicast tree, judging whether a parent node of the old node is able to support all child nodes of the old node left the multicast tree;

if yes, connecting all child nodes of the old node to the parent node; and if no, according to a number of child nodes that the parent node is currently able to support, joining a part of child nodes of the old node as the child nodes of the parent node, and joining the rest child nodes of the old node in the multicast tree again as new nodes.

16. A system for transmitting live media stream in P2P networks, suitable for managing a plurality of nodes under a multicast tree to transmit a live media stream, comprising:

a processor;

a target establishment module, configured to calculate a reliability of each of the nodes according to an accumulated on-line time of the node and a number of child nodes that are able to be supported by the node, and rearrange the nodes according to the number of child nodes and the reliability of each node to establish an ideal reliable multicast tree, wherein the nodes are arranged in a descending order according to the reliabilities of the nodes in the ideal reliable multicast tree, and the nodes at upper level of the ideal reliable multicast tree has greater reliability; and a node adaptation module, configured to adapt a location of each of the nodes in the multicast tree in sequence in a descending order according to the reliability of the node, so a level difference between an adapted level of the node in the multicast tree and a level of the node in the ideal reliable multicast tree is the smallest.

17. The system for transmitting a live media stream in P2P networks according to claim 16, further comprising:
a cost evaluation module, configured to evaluate an improved delay time after reconnection for adapting locations of the nodes in the multicast tree when a periodic adaptive time is reached, and control the node adaptation module to adapt the locations of the nodes in the multicast tree when the improved delay time after reconnection is smaller than a delay time without reconnection for node adaptation.

18. The system for transmitting a live media stream in P2P networks according to claim 16, wherein the target establishment module comprises:
a reliability calculation unit, configured to respectively quantify the number of child nodes and the on-line time of each of the nodes into a bandwidth fraction and a time fraction, and respectively multiply the bandwidth fraction and the time fraction by a corresponding weight value and calculating a sum, so as to obtain the reliability of the node; and
a depth tree establishment unit, configured to take a node having the greatest reliability as a parent node of the ideal reliable multicast tree, join the rest nodes as at least a child node under the parent node in a descending order in sequence according to the reliabilities of the rest nodes, in which a number of the at least a child node is equal to the number of child nodes that are able to be supported by the parent node, take the at least a child node as a parent node, and continue joining rest nodes under the at least a child node until all nodes are joined, thus finishing the ideal reliable multicast tree.

19. The system for transmitting a live media stream in P2P networks according to claim 18, wherein the target establishment module further comprises:
a node number calculation unit, configured to subtract a currently used bandwidth from a maximum bandwidth that each of the nodes is able to support to obtain a rest bandwidth, dividing the rest bandwidth by a bit rate of the live media stream to estimate an extra number of nodes that the node is able to support, and adding the extra number of nodes of the node to the number of child nodes already connected under the node to obtain the number of child nodes that are able to be supported by the node.

20. The system for transmitting a live media stream in P2P networks according to claim 16, wherein the node adaptation module comprises:
a location comparison unit, configured to compare a current level of a current node currently to be adapted in the multicast tree with an ideal level of the current node in the ideal reliable multicast tree, if the current level is greater than the ideal level, adapt the location of the node, and if the current level is smaller than or equal to the ideal level, not adapt the location of the node.

21. The system for transmitting a live media stream in P2P networks according to claim 20, wherein the node adaptation module further comprises:
a node selection unit, configured to select one of at least a node at an upper level of the ideal level in the multicast tree as a target node, and completely move the current node and all child nodes thereof under the target node to be the child nodes of the target node.

22. The system for transmitting a live media stream in P2P networks according to claim 21, wherein the node selection unit further judges whether all nodes at an upper level of the ideal level are already fully loaded, if certain nodes are not fully loaded, completely moves the current node and all child nodes thereof under the target node to be the child nodes of the target node, and if all the nodes are already fully loaded, selects one of the at least a node at the ideal level of the multicast tree as the target node, and exchanges the locations of the current node and the target node.

23. The system for transmitting a live media stream in P2P networks according to claim 21, wherein the node adaptation module further comprises:
a parameter comparison unit, configured to judge whether reliabilities of all of the nodes at the ideal level are higher than the reliability of the current node, if reliabilities of certain nodes are smaller than or equal to the reliability of the current node, select the node as the target node, and exchange the locations of the current node and the target node, if the reliabilities of all of the nodes are greater than the reliability of the current node, descend the ideal level by a level, wherein the node selection unit reselects the target node to adapt locations of the nodes until the ideal level is equal to the current level of the node.

24. The system for transmitting a live media stream in P2P networks according to claim 23, wherein the parameter comparison unit further compares total delay parameters before and after the exchange of the locations of the current node and the target node, if the total delay parameter after exchange is smaller than the total delay parameter before exchange, exchanges locations of the current node and the target node, and if the total delay parameter after exchange is greater than or equal to the total delay parameter before exchange, does not exchange the locations of the current node and the target node.

25. The system for transmitting a live media stream in P2P networks according to claim 21, wherein the node adaptation module further comprises:
a location exchange unit, configured to judge whether a vertical transmission relationship exists between the current node and the target node, and exchange the locations of the current node and the target node, wherein if the vertical transmission relationship exists, continue judging whether the current node is able to support a new node, wherein if the current node is not able to support the new node, join the exchanged target node to the multicast tree again.

26. The system for transmitting a live media stream in P2P networks according to claim 16, wherein the node adaptation module further comprises:
a location update unit, configured to reconnect the nodes in the multicast tree according to an adaptation result of each of the nodes, and transmit the live media stream to the reconnected nodes.

27. The system for transmitting a live media stream in P2P networks according to claim 16, further comprising:
a node adding module, configured to search for one of at least a node which are not fully loaded in the multicast tree as a target node when a new node joins the multicast tree, so as to join the new node as the child node of the target node.

28. The system for transmitting a live media stream in P2P networks according to claim 16, further comprising:
a node leaving module, configured to judge whether a parent node of an old node is able to support all child nodes of the old node when the old node leaves the multicast tree, wherein
if yes, all the child nodes of the old node are connected to the parent node; and if no, according to the number of child nodes that the parent node is currently able to support, a part of child nodes of the old node are joined as child nodes of the parent node, and the rest child nodes of the old node are joined in the multicast tree again as new nodes.

\* \* \* \* \*